(12) United States Patent
Ishiwata et al.

(10) Patent No.: US 10,514,767 B2
(45) Date of Patent: Dec. 24, 2019

(54) INFORMATION PROCESSING APPARATUS AND INFORMATION PROCESSING METHOD

(71) Applicant: SONY CORPORATION, Tokyo (JP)

(72) Inventors: Katsutoshi Ishiwata, Kanagawa (JP); Akihiro Komori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 631 days.

(21) Appl. No.: 14/776,906

(22) PCT Filed: Jan. 24, 2014

(86) PCT No.: PCT/JP2014/051536
§ 371 (c)(1),
(2) Date: Sep. 15, 2015

(87) PCT Pub. No.: WO2014/162762
PCT Pub. Date: Oct. 9, 2014

(65) Prior Publication Data
US 2016/0041619 A1 Feb. 11, 2016

(30) Foreign Application Priority Data
Apr. 2, 2013 (JP) .................................. 2013-076724

(51) Int. Cl.
*G06F 3/048* (2013.01)
*G06F 3/01* (2006.01)
(Continued)

(52) U.S. Cl.
CPC .............. *G06F 3/017* (2013.01); *G06F 1/163* (2013.01); *G06F 3/01* (2013.01); *G06F 3/011* (2013.01);
(Continued)

(58) Field of Classification Search
None
See application file for complete search history.

(56) References Cited

U.S. PATENT DOCUMENTS 6,771,294 B1 * 8/2004 Pulli ....................... G06F 3/011
345/173
2004/0193413 A1 * 9/2004 Wilson .................... G06F 3/017
704/243
(Continued)

FOREIGN PATENT DOCUMENTS

CN 102057347 A 5/2011
EP 2000894 A2 12/2008
(Continued)

OTHER PUBLICATIONS

Yoshiyuki Kojima et al., Hand Manipulation of Virtual Objects in Wearable Augmented Reality, 2001, IEEE Computer Society, pp. 1-7 (Year: 2001).*

(Continued)

Primary Examiner — Tam T Tran
(74) Attorney, Agent, or Firm — Chip Law Group

(57) ABSTRACT

Provided is an information processing apparatus including: a hand-shape recognition unit configured to recognize a hand shape of an operator on a basis of measured information related to a hand of the operator; and a display control unit configured to move a display position of an operation object on a display screen according to a change in a position of the hand of the operator when the hand shape of the operator is a predetermined shape.

16 Claims, 19 Drawing Sheets

(51) Int. Cl.
*G06F 1/16* (2006.01)
*G06F 3/03* (2006.01)
*G06F 3/0481* (2013.01)
*G06K 9/00* (2006.01)

(52) U.S. Cl.
CPC ........ *G06F 3/0304* (2013.01); *G06F 3/04812* (2013.01); *G06K 9/00355* (2013.01)

(56) References Cited

U.S. PATENT DOCUMENTS

| | | | |
|---|---|---|---|
| 2006/0001650 A1* | 1/2006 | Robbins | G06F 3/0421 345/173 |
| 2006/0209021 A1 | 9/2006 | Yoo et al. | |
| 2007/0252832 A1 | 11/2007 | Ratai | |
| 2008/0141181 A1* | 6/2008 | Ishigaki | G06F 3/011 715/863 |
| 2010/0199232 A1 | 8/2010 | Mistry et al. | |
| 2010/0201621 A1* | 8/2010 | Niikawa | G06F 3/013 345/158 |
| 2011/0018804 A1* | 1/2011 | Homma | G06F 3/017 345/158 |
| 2012/0032979 A1* | 2/2012 | Blow | G06F 1/1626 345/647 |
| 2012/0287284 A1* | 11/2012 | Jacobsen | G06F 1/163 348/158 |
| 2013/0016070 A1* | 1/2013 | Starner | G02B 27/017 345/175 |
| 2013/0033483 A1 | 2/2013 | Im et al. | |
| 2014/0089849 A1* | 3/2014 | Choi | G06F 3/017 715/810 |
| 2015/0277555 A1* | 10/2015 | Morishita | G06F 3/011 345/156 |

FOREIGN PATENT DOCUMENTS

| | | |
|---|---|---|
| JP | 08-006708 A | 1/1996 |
| JP | 2000-075991 A | 3/2000 |
| JP | 2004-142656 A | 5/2004 |
| JP | 2005-301668 A | 10/2005 |
| JP | 2009-075685 A | 4/2009 |
| JP | 2010-015553 A | 1/2010 |
| JP | 2011-028366 A | 2/2011 |
| JP | 2011-513847 A | 4/2011 |
| JP | 2012-068854 A | 4/2012 |
| WO | 2010/073928 A1 | 7/2010 |
| WO | 2010073928 A1 | 7/2010 |
| WO | 2010/098050 A1 | 9/2010 |
| WO | 2010098050 A1 | 9/2010 |

OTHER PUBLICATIONS

Gang Ren et al., 3D Marking Menu Selection with Freehand Gestures, Mar. 1, 2012, IEEE, pp. 61-68 (Year: 2012).*
Rick Kjeldsen et al., Interaction with On-Screen Objects using Visual Gesture Recognition, Jan. 1, 1997, IEEE, pp. 788-793 (Year: 1997).*
Office Action for JP Patent Application No. 2015-509931, dated Aug. 8, 2017, 04 pages of Office Action and 03 pages of English Translation.
Extended European Search Report of EP Patent Application No. 14779658.5, dated Oct. 27, 2016, 13 pages.
"marisil.org: Handsmart Mobile Augmented Reality User Interface prototype", https://www.youtube.com/ watch?=U OAEOFRIChM, Mar. 28, 2011, 02 pages.
Office Action for CN Patent Application No. 201480018454.X, dated Nov. 6, 2017, 07 pages of Office Action and 12 pages of English Translation.
Office Action for JP Patent Application No. 2017-242459, dated Oct. 16, 2018, 04 pages of Office Action and 03 pages of English Translation.

* cited by examiner

FIG.19
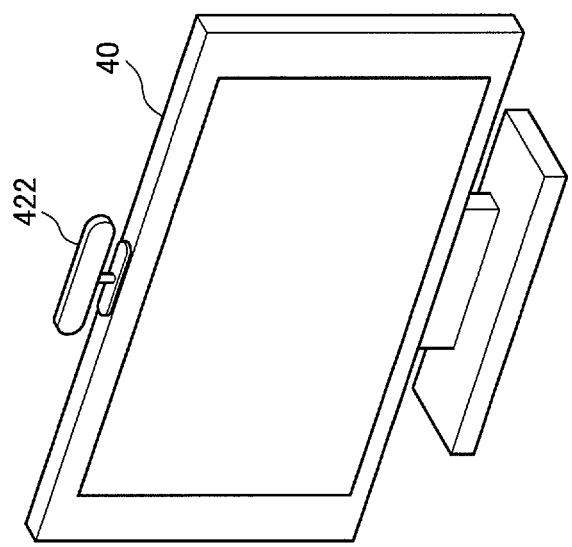
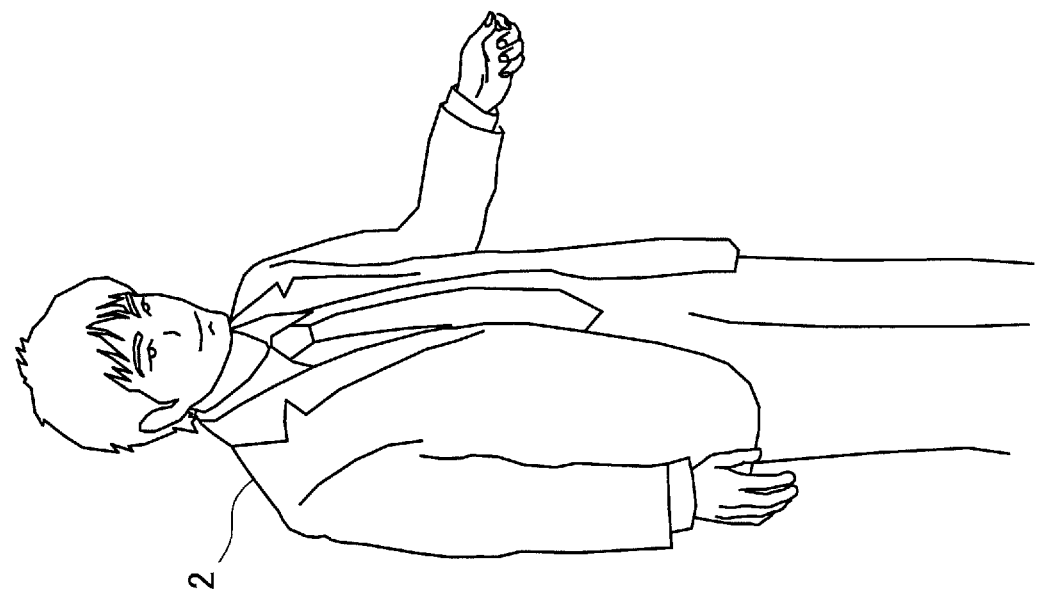

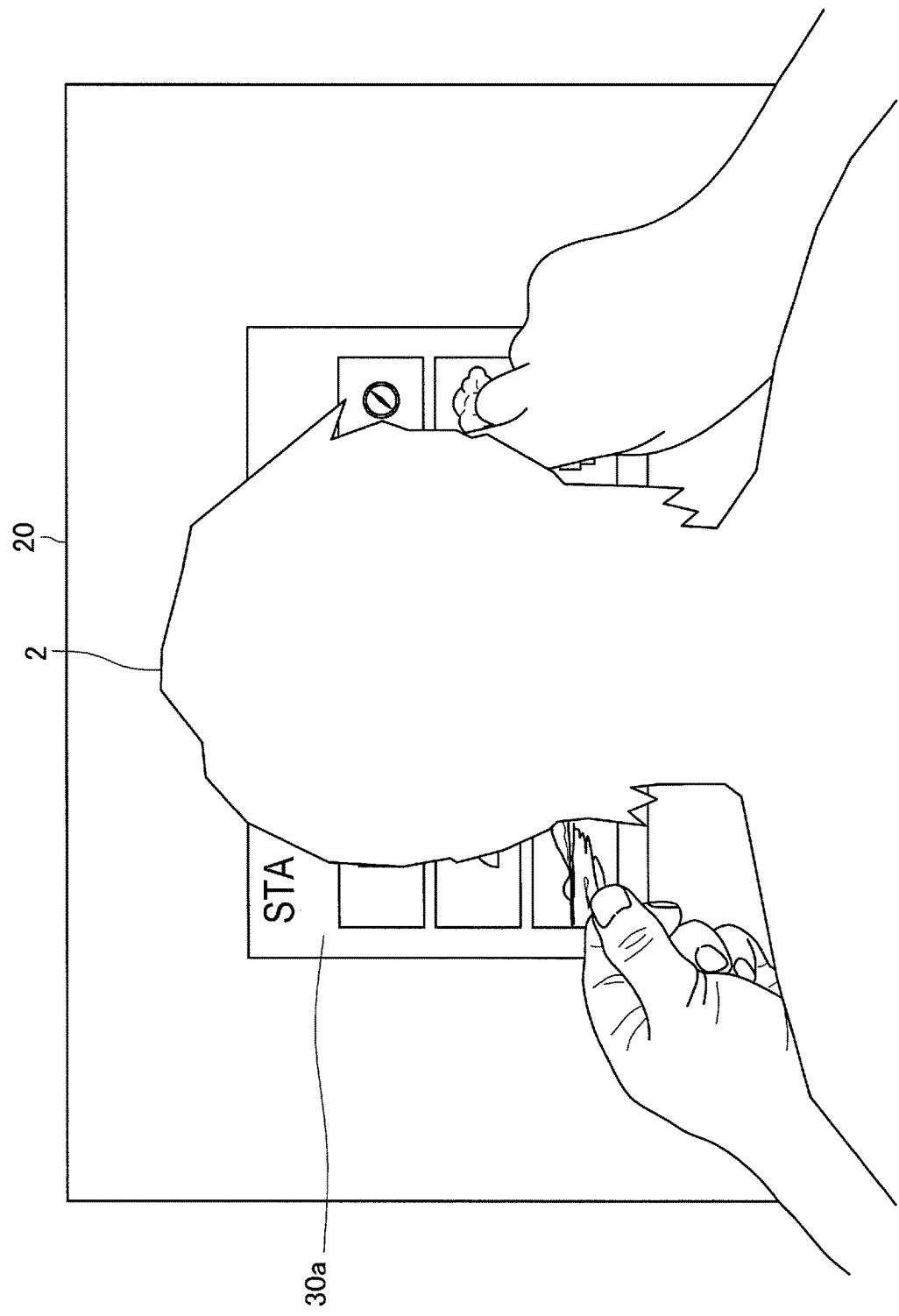

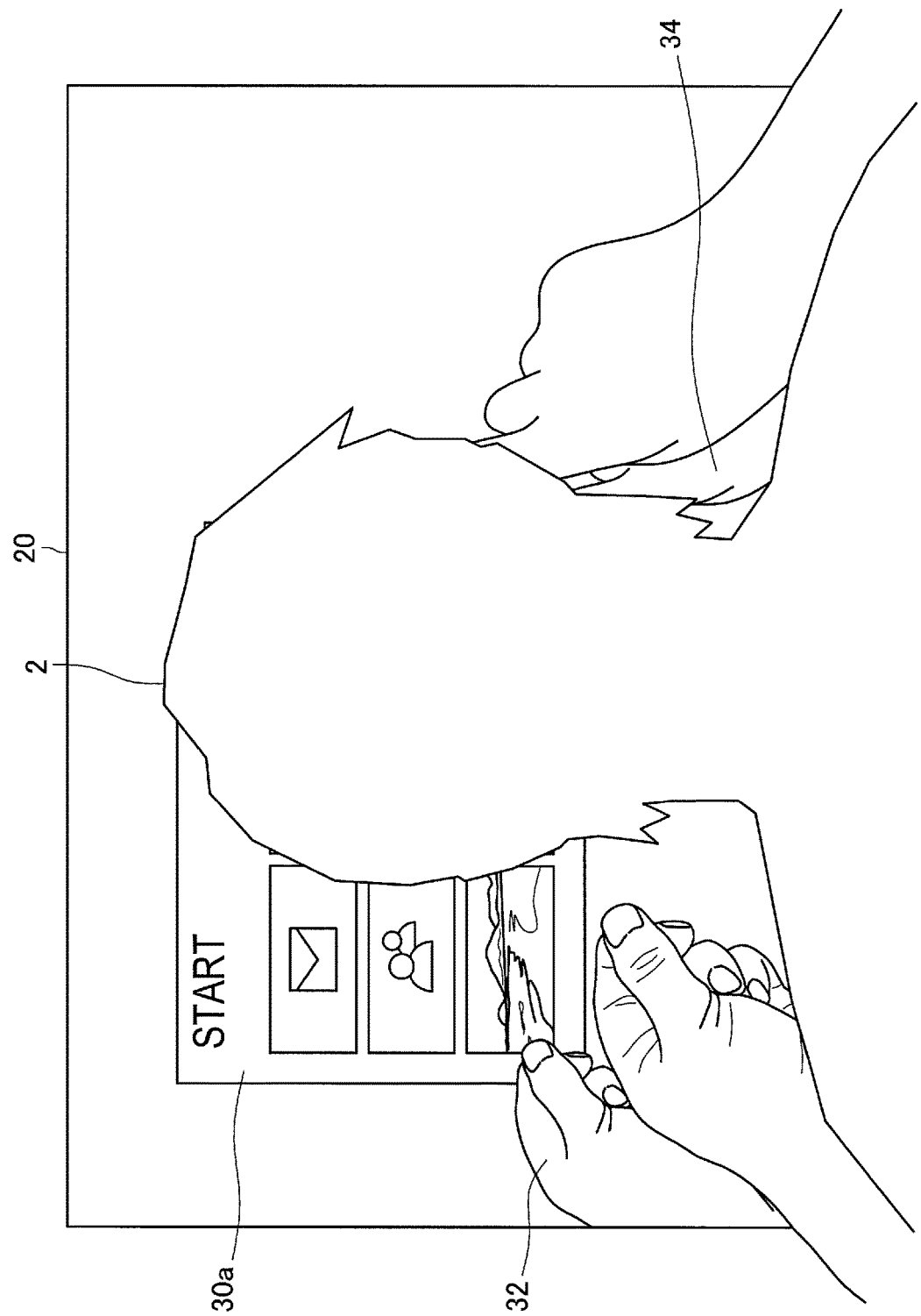

INFORMATION PROCESSING APPARATUS AND INFORMATION PROCESSING METHOD

TECHNICAL FIELD

The present disclosure relates to an information processing apparatus, an information processing method, and a program.

BACKGROUND ART

Hitherto, research relating to a graphical user interface (GUI) has been conducted with the objective of enabling a user to intuitively operate an information processing apparatus such as a personal computer (PC). Typically, with a GUI, by using a pointing device, for example, to move a pointer on a display screen and by selecting an object such as an icon or a button on the display screen, the user can make a computer execute a process corresponding to the selected object.

Furthermore, a technology for the user to operate a display screen without using input devices such as a keyboard, a mouse, and the like has been proposed. For example, Patent Literature 1 discloses a technology that determines details of an operation performed on a display screen by an operator by recognizing a gesture operation performed with both hands of the operator.

CITATION LIST

Patent Literature

Patent Literature 1 JP 2012-068854A

SUMMARY OF INVENTION

Technical Problem

However, in the technology described above, the physical load on the operator during operation of the display screen is large. For example, in the technology described above, the user can perform a gesture operation only at a position on a virtual operation surface that has been initially set in real space and, further, the user cannot move the position of the virtual operation surface. Accordingly, the arm position and angle for performing the gesture operation are limited and when the operator performs an operation for a long period of time, the physical load such as, for example, fatigue in the arm, becomes large.

Accordingly, in the present disclosure, a novel and improved information processing apparatus, an information processing method, and a program that are capable of reducing the physical load on the operator during operation of the display screen are proposed.

Solution to Problem

In order to solve the above problems, according to an aspect of the present disclosure, there is provided an information processing apparatus including: a hand-shape recognition unit configured to recognize a hand shape of an operator on a basis of measured information related to a hand of the operator; and a display control unit configured to move a display position of an operation object on a display screen according to a change in a position of the hand of the operator when the hand shape of the operator is a predetermined shape.

In order to solve the above problems, according to another aspect of the present disclosure, there is provided an information processing method including: recognizing a hand shape of an operator on a basis of measured information related to a hand of the operator; and moving a display position of an operation object on a display screen according to a change in a position of the hand of the operator when the hand shape of the operator is a predetermined shape.

In order to solve the above problems, according to another aspect of the present disclosure, there is provided a program for causing a computer to function as: a hand-shape recognition unit configured to recognize a hand shape of an operator on a basis of measured information related to a hand of the operator; and a display control unit configured to move a display position of an operation object on a display screen according to a change in a position of the hand of the operator when the hand shape of the operator is a predetermined shape.

Advantageous Effects of Invention

As described above, the present disclosure is capable of reducing the physical load on the operator during operation of the display screen.

BRIEF DESCRIPTION OF DRAWINGS

FIG. 19 is an external view illustrating a person operating a UI panel according to a third embodiment of the present disclosure.

FIG. 21 is a first explanatory drawing illustrating a display example of a display screen according to the same embodiment.

FIG. 22 is a second explanatory drawing illustrating a display example of a display screen according to the same embodiment.

DESCRIPTION OF EMBODIMENTS

Figure 1:
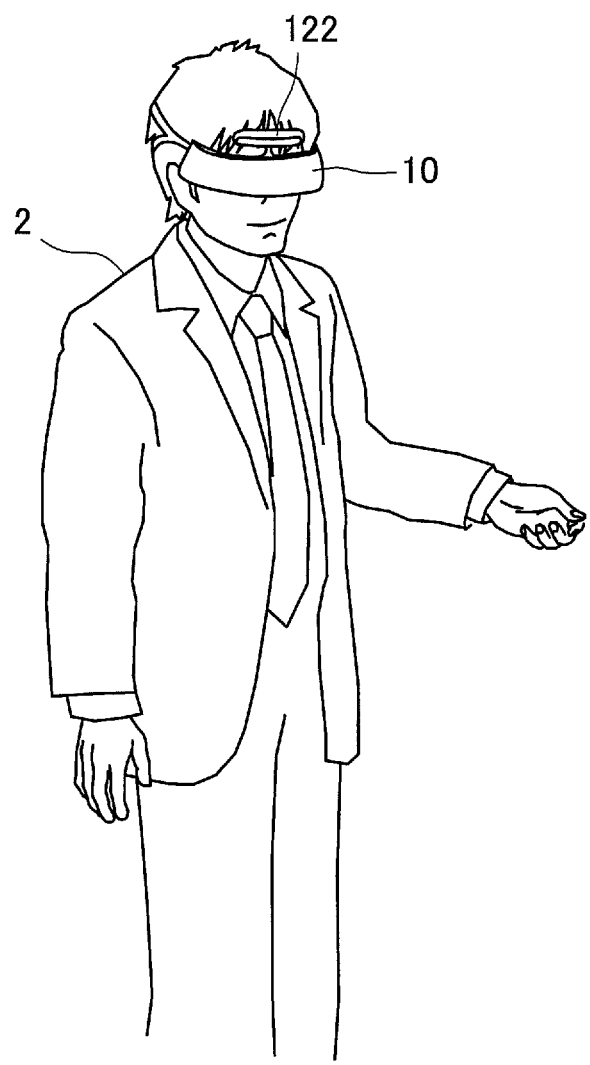
FIG. 1 is an external view illustrating a person operating a UI panel according to a first embodiment of the present disclosure.

Hereinafter, preferred embodiments of the present disclosure will be described in detail with reference to the attached drawings. The present disclosure can be embodied in various forms as described in detail as examples of the disclosure from "1. Detailed description of first embodiment" to "3. Detailed description of third embodiment". Furthermore, the "Description of Embodiments" will be described in the following order with the items illustrated below.
1. Detailed description of first embodiment
2. Detailed description of second embodiment
3. Detailed description of third embodiment
4. Modifications Note that in the present description and the drawings, components with substantially the same functional configuration are attached with the same sign so as to omit repetition of description.

Furthermore, a plurality of components with substantially the same functional configuration may be attached with different alphabetical characters after the same sign so as to make distinctions among the components. For example, a plurality of components that have substantially the same functional configuration are distinguished as a UI panel 30*a* and a UI panel 30*b* as necessary. However, in a case in which a plurality of components with substantially the same functional configuration do not need to be distinguished in particular, the components are only attached with the same sign. For example, in a case in which the UI panel 30*a* and the UI panel 30*b* do not particularly need to be distinguished, the UI panel 30*a* and the UI panel 30*b* are each merely referred to as a UI panel 30.

—Background—

Hitherto, although ideas of operating a piece of equipment with a gesture of an operator have been conceived, the following points have risen as problems. First, in conventional ideas, since there is no physical feedback when the equipment is operated through gestures, no feel of operating the equipment occurs in the operator. Second, in conventional ideas, since the operator needs to lift the arms forward when making a gesture, when the operator is performing operation for a long period of time, physical pain, such as severe fatigue occurring in, for example, the shoulders, the arms, and the elbows occurs. Third, in conventional ideas, it is difficult for the operator to accurately select an icon when a virtual icon that is disposed in real space is displayed on a two-dimensional display.

Accordingly, having the above situation as a focal point, an HMD 10 and a video device 40 of the embodiments have been created. Since the HMD 10 and the video device 40 of the embodiments allow an operation object to be moved to a position that is easy for the operator to operate the operation object, the physical load on the operator during operation of the display screen can be reduced.

1. Detailed Description of First Embodiment

[1-1. Basic Configuration]

First, a basic configuration of the HMD 10 (an information processing apparatus) according to a first exemplary embodiment will be described with reference to FIG. 1. As illustrated in FIG. 1, the HMD 10 is a display device for having an operator 2 view a display screen 20 illustrated in FIG. 2, for example. The HMD 10 may be a head mounted display that is mounted on the head of the operator 2 or may be, for example, a spectacle-type computer including a see-through type display. Furthermore, the HMD 10 is capable of displaying on the display screen 20 a still image or a moving image that has been taken or a two-dimensional object or a three-dimensional object that has been drawn by computer graphics.

Figure 2:
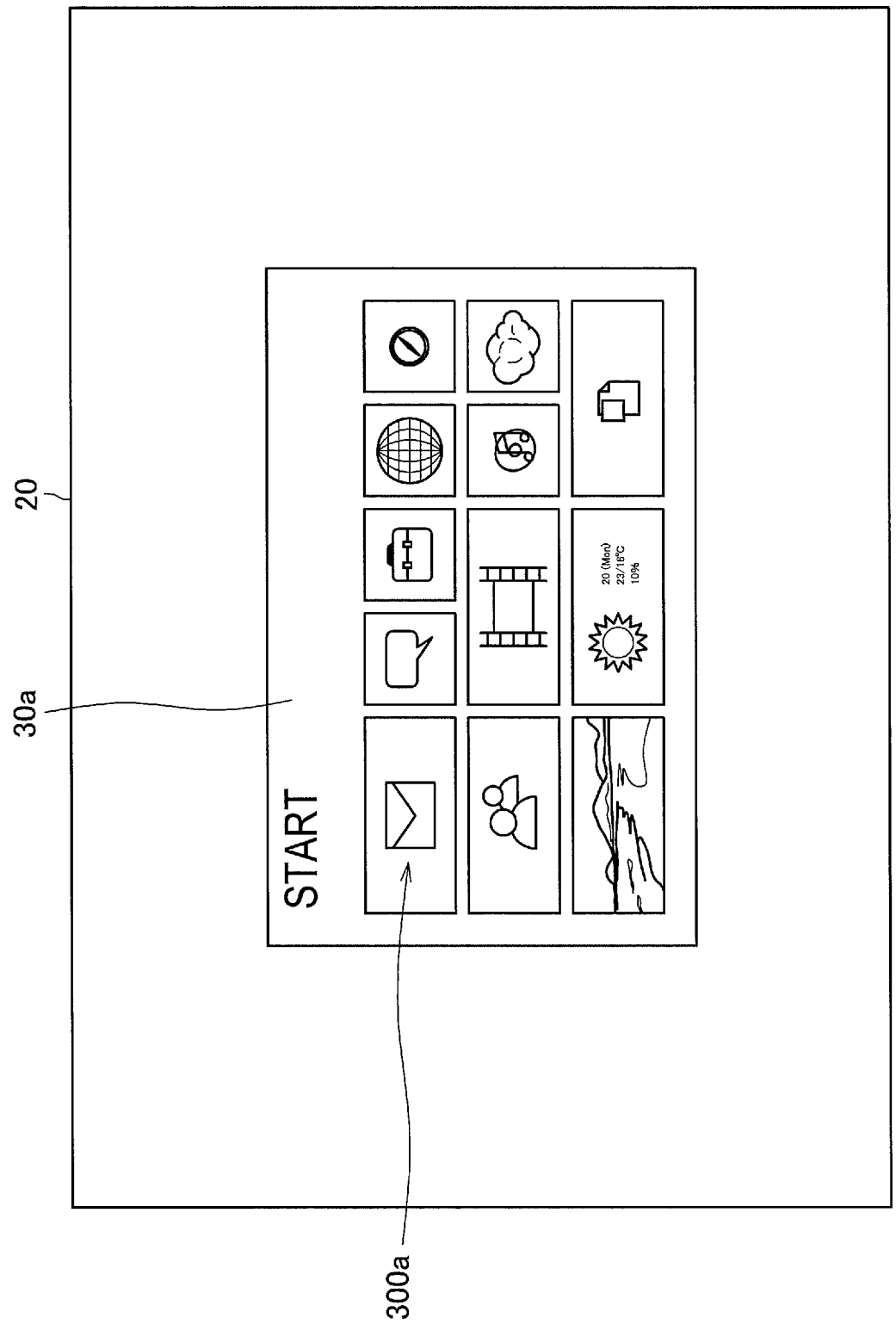
FIG. 2 is an explanatory drawing illustrating a hardware configuration of an HMD according the same embodiment.

FIG. 2 is an explanatory drawing illustrating an example of the display screen 20 displayed by the HMD 10. As illustrated in FIG. 2, the display screen 20 includes an operation object such as, for example, the UI panel 30*a* (an operation surface). Note that the HMD 10 is capable of expressing the operation object as a three-dimensional object. For example, when the operator 2 performs an operation of moving the operation object in the depth direction of the display screen 20, the HMD 10 is capable of displaying the operation object on the display screen 20 in a reduced manner. Furthermore, the HMD 10 is capable of, similar to a billboard, displaying the UI panel 30 in an orientation that opposes the eyes of the operator 2 at all times even when the position of the operator 2 should change.

Furthermore, as illustrated in FIG. 2, the UI panel 30*a* includes icons 300 for starting various applications, for example. Note that the UI panel 30*a* may further include a button, an image, text, and the like.

Furthermore, the HMD 10 can change the display position of the UI panel 30 on the display screen 20 by recognizing the hand shape and the hand position of the operator 2 on the basis of information obtained through the imaging unit 120 or the sensor unit 122 described later. Furthermore, by recognizing the hand motion of the operator 2, the HMD 10 is capable of recognizing the operation performed by the operator 2 selecting an icon 300, a button, an image, text, and the like and, further, is capable of executing a predetermined process corresponding to the selection operation, such as starting an application corresponding to the selected icon 300, for example.

Note that in FIG. 1, although an example in which the operator 2 operates the UI panel 30 while standing is described, not limited to the above, the operator 2 can operate the UI panel 30 while sitting on a seat, for example.

—Hardware Configuration—

Figure 3:
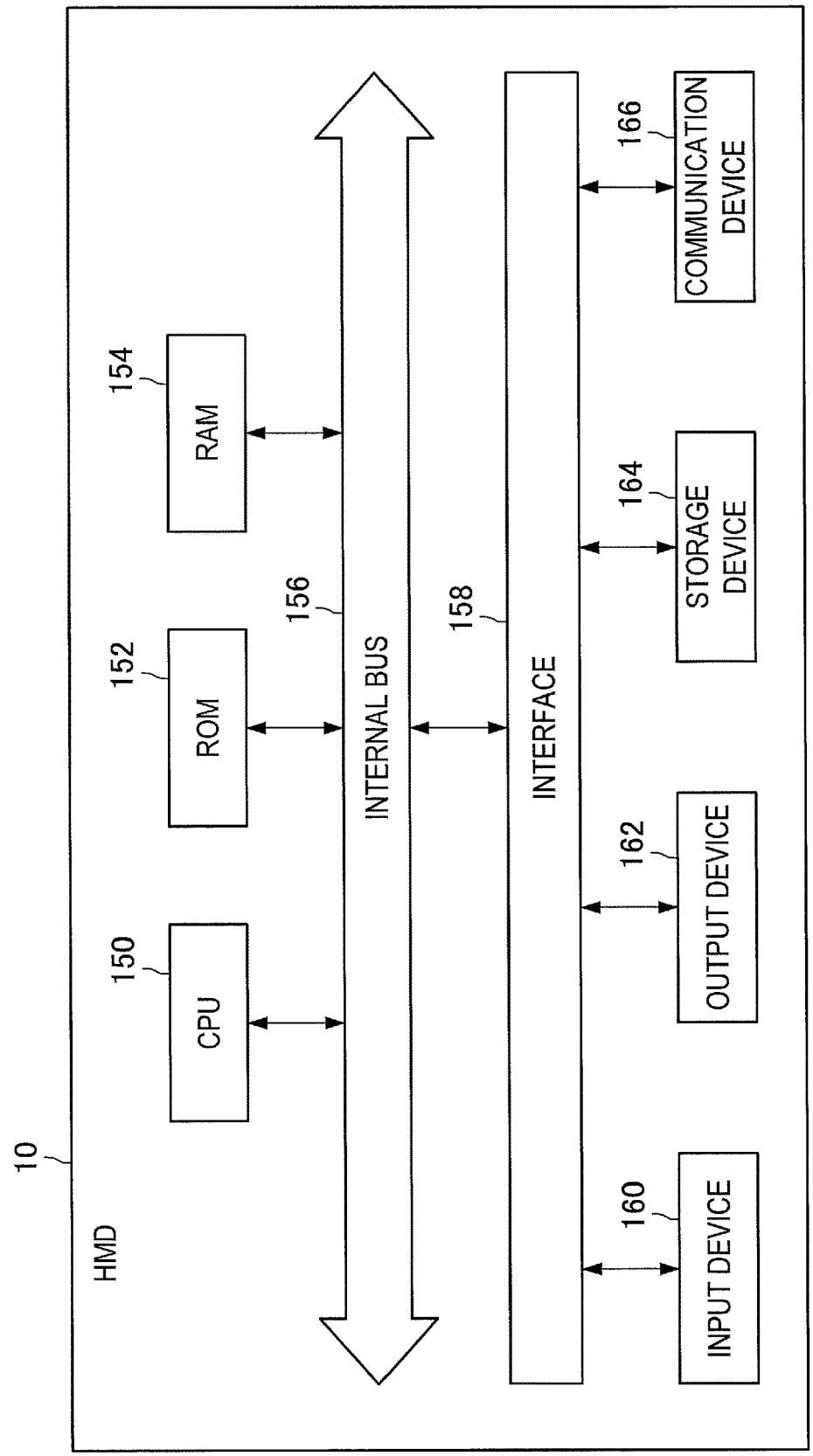
FIG. 3 is an explanatory drawing illustrating a display example of a display screen according to the same embodiment.

Furthermore, the HMD 10 has a hardware configuration as illustrated in FIG. 3, for example. As illustrated in FIG. 3, the HMD 10 includes a central processing unit (CPU) 150, a read-only memory (ROM) 152, a random-access memory (RAM) 154, an internal bus 156, an interface 158, an input device 160, an output device 162, a storage device 164, and a communication device 166.

The CPU 150 is configured as an example of a controller 100, a hand-shape recognition unit 102, a motion recognition unit 104, a display control unit 106, and a determination unit 108 that are described later, for example. The CPU 150 functions as an arithmetic processing unit and a controller and controls the overall operation of the HMD 10 according to various programs. The CPU 150 may be a microprocessor.

The ROM 152 stores programs, operation parameters, and the like that are used by the CPU 150. Furthermore, the RAM 154 temporarily stores programs used in the execution of the CPU 150 and the parameters and the like that appropriately changes during the execution. The CPU 150, the ROM 152, and the RAM 154 are connected to each other with the internal bus 156 configured by a CPU bus and the like.

The interface 158 connects the input device 160, the output device 162, the storage device 164, and the communication device 166 to the internal bus 156. For example, the input device 160 exchanges data with the CPU 150 and the like through the interface 158 and the internal bus 156.

The input device 160 receives input of depth information obtained by the sensor unit 122 and captured image taken with a camera. Furthermore, the depth information and the captured image, the inputs of which have been received by the input device 160, are output to the CPU 150.

For example, the output device 162 includes display devices such as a liquid crystal display (LCD) device, an organic light emitting diode (OLED) device, a lamp, and the like. Furthermore, the output device 162 includes a sound output device, such as a speaker. For example, the display device displays a captured image and a generated image. Meanwhile, the speech output device converts audio data and the like into sound and outputs the sound.

The storage device 164 is a device for storing data and is configured as an example of a storage unit 110 described later, for example. The storage device 164 may include a storage medium, a recording device that records data in the storage medium, a readout device that reads out data from the storage medium, a deletion device that deletes data recoded in the storage medium, and the like. The storage device 164 stores programs that the CPU 150 executes and various kinds of data.

The communication device 166 is a communication interface configured by a communication device or the like for connecting to a communication network such as the Internet, for example. Furthermore, the communication device 166 may be a wireless LAN-enabled communication device, a Long Term Evolution (LTE)-enabled communication device, or a wired communication device that performs wired communication.

Figure 4:
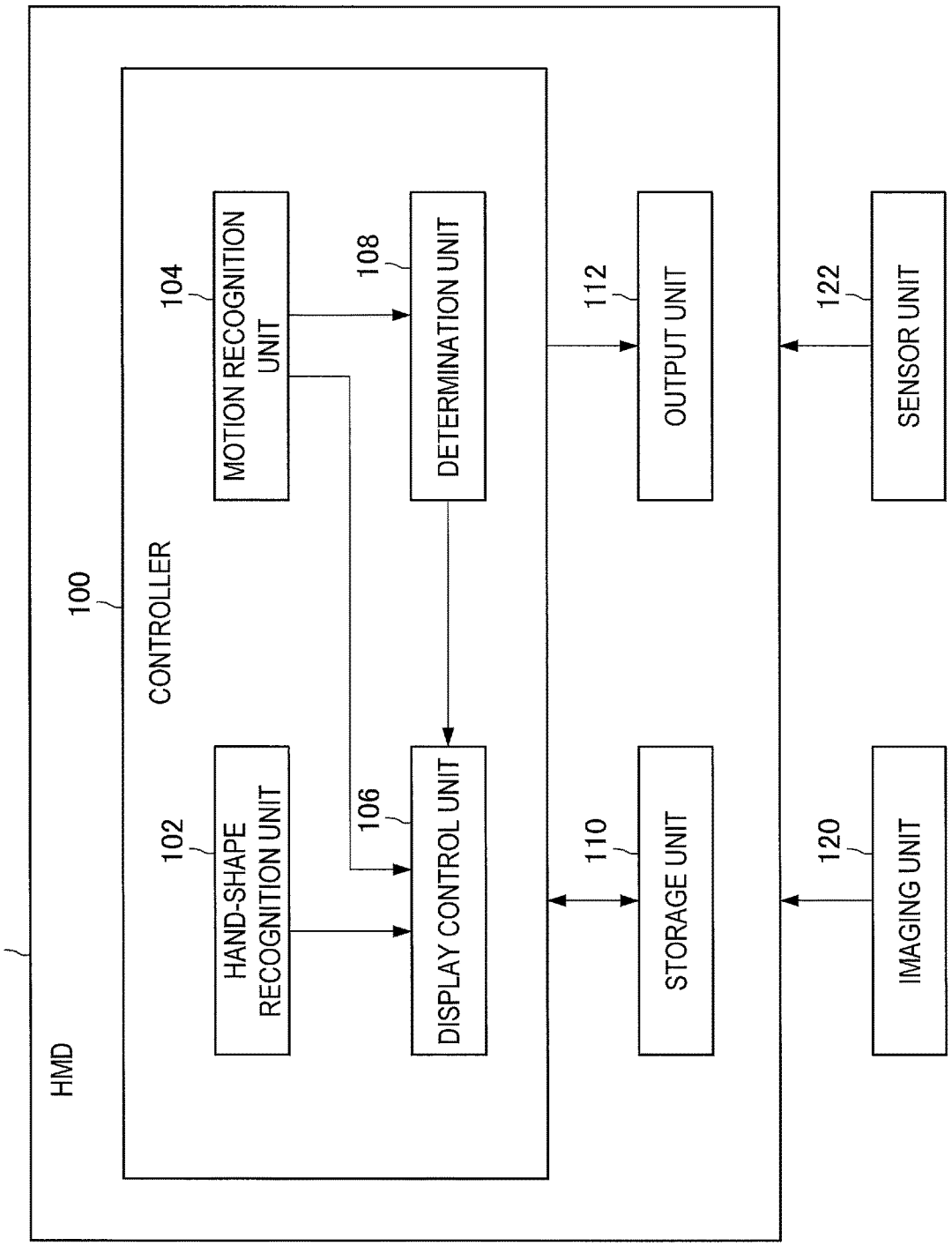
FIG. 4 is a functional block diagram illustrating a configuration of the HMD according to the same embodiment.

[1-2. Configuration]
(1-2-1. Configuration of HMD 10)
The basic configuration of the HMD 10 of the first embodiment has been described above. Subsequently, a configuration according to the first embodiment will be described in detail. FIG. 4 is a functional block diagram illustrating a configuration of the HMD 10 according to the first embodiment. As illustrated in FIG. 4, the HMD 10 includes the controller 100, the storage unit 110, and an output unit 112. Furthermore, the controller 100 includes the hand-shape recognition unit 102, the motion recognition unit 104, the display control unit 106, and the determination unit 108.

The controller 100 has a function of generally controlling the operation of the HMD 10 by using hardware such as the CPU 150 and the RAM 154 that are built in the HMD 10. For example, the controller 100 controls the operation of the storage unit 110 and the output unit 112.

The hand-shape recognition unit 102 recognizes the hand shape of the operator 2 on the basis of, for example, the image of the hand of the operator 2 taken by the imaging unit 120 described later or the depth information of the hand of the operator 2 measured by the sensor unit 122 described later.

More specifically, the hand-shape recognition unit 102 is capable of recognizing the hand shape of the operator 2 by performing an image pattern matching on the taken image of the hand of the operator 2. For example, dictionary data for pattern matching can be created, in advance, by extracting feature amounts, such as a Haar-like feature amount, with a certain image processing device using captured image data of hands of a plurality of people that have been formed in a predetermined shape such as the shape illustrated in FIG. 5, for example, and by performing machine learning. Then, the hand-shape recognition unit 102 is capable of determining whether the hand shape of the operator 2 is the same as the predetermined hand shape by performing, on the image of the operator 2 captured by the imaging unit 120, computation of the distance to the hand of the operator 2 and the feature amounts relating to the hand of the operator 2 and comparison between the computation result and the above dictionary data. Note that the image processing device described above may be the HMD 10 or may be a different device.

Alternatively, by computing the position of each finger of the hand of the operator 2 by bone estimation of the fingers, for example, on the basis of the depth information of the hand of the operator 2 measured by the sensor unit 122, and from the positional relationship of the fingers that has been computed, the hand-shape recognition unit 102 is capable of recognizing the hand shape of the operator 2.

Figure 5:
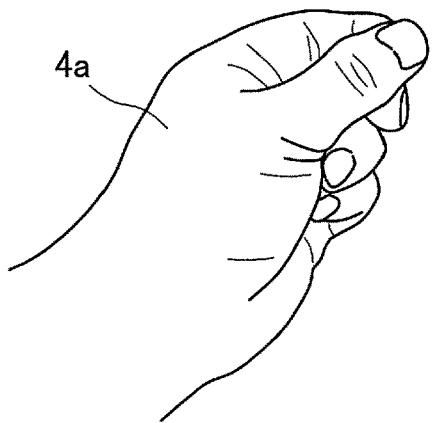
FIG. 5 is a first explanatory drawing illustrating an example of a hand shape holding the UI panel according to the same embodiment.
Figure 6:
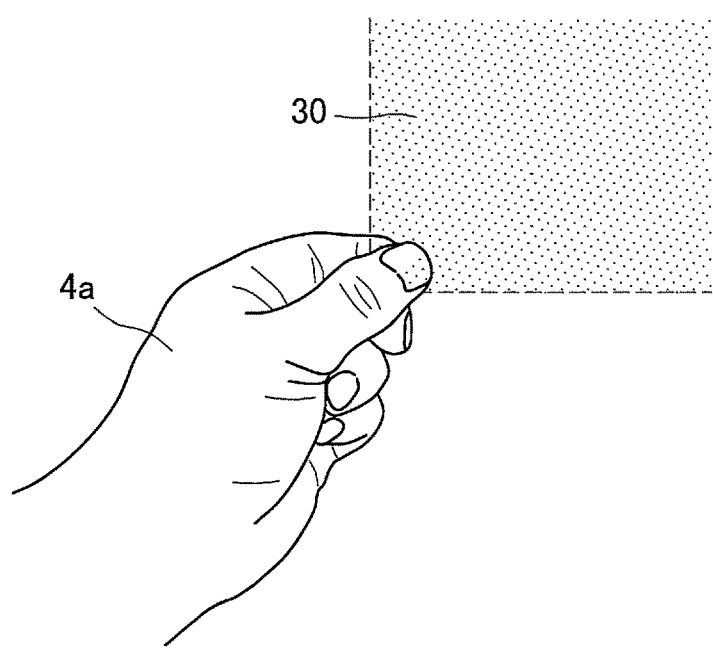
FIG. 6 is a second explanatory drawing illustrating an example of a hand shape holding the UI panel according to the same embodiment.
Figure 8:
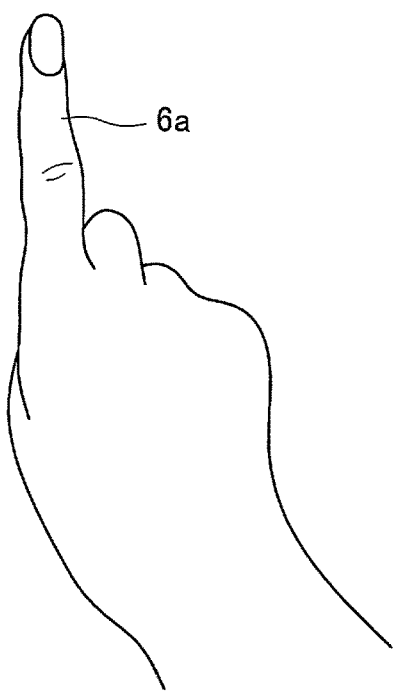
FIG. 8 is an explanatory drawing illustrating an example of a finger pointing hand shape according to the same embodiment.

For example, the hand-shape recognition unit 102 recognizes whether a hand shape of a first hand of the operator 2 has a hand shape 4a of holding the UI panel 30 as illustrated in FIGS. 5 and 6. Furthermore, the hand-shape recognition unit 102 recognizes whether a hand shape of a second hand of the operator 2 has a finger pointing shape 6a as illustrated in FIG. 8. Note that, as described later, the first hand is a hand for moving the display position of the UI panel 30 and the second hand is a hand for performing operations on the UI panel 30.

Note that hereinafter in the present description, description will be given while the first hand is the left hand and the second hand is the right hand. However, not limited to the above example, the first hand may be the right hand and the second hand may be the left hand. It can be cited as an effect of the above modification that the ease of operation does not change even if the operator 2 is right-handed or left-handed.

While the details will be described later, when the hand shape of the left hand of the operator 2 is formed in the hand shape 4a holding the UI panel 30, as illustrated in FIG. 6, the HMD 10 is capable of disposing the UI panel 30 between the thumb and the index finger of the left hand in real space, for example. Accordingly, even if the operator 2 moves the left hand, the operator 2 can easily recognize the position of the UI panel 30 in real space after the movement.

Furthermore, when the hand shape of the right hand of the operator 2 is formed in the finger pointing shape 6a, the HMD 10 is capable of recognizing that the position in the UI panel 30 corresponding to the position of the tip of the index finger of the right hand in real space, for example, is the position selected by the operator 2. It can be cited as an effect of the above that the operator 2 can accurately select the desired position in the UI panel 30 since the operator 2 can perceive the positional relationship between the position of the left hand in real space, in other words, the position in which the UI panel 30 is disposed, and the position of the finger of the right hand.

In addition to the function described above, the hand-shape recognition unit 102 is capable of recognizing the operation of the operator 2 that is similar to the operation employed in a touch panel, for example. For example, when the position of the finger of the right hand of the operator 2 is behind the position of the left hand and when the hand-shape recognition unit 102 recognizes a motion of moving the right-hand in the up, down, left, or right direction, the hand-shape recognition unit 102 may recognize that a hovering operation has been performed at a display position corresponding to the position of the finger of the right hand. Furthermore, when the hand-shape recognition unit 102 recognizes that the position of the finger of the right hand is in front of the position of the left hand, the hand-shape recognition unit 102 may recognize that a determination operation such as a tap has been performed at the display position corresponding to the position of the finger of the right hand. Furthermore, when the position of the finger of the right hand is in front of the position of the left hand and when the hand-shape recognition unit 102 recognizes a motion of moving the right-hand in the up, down, left, or right direction, the hand-shape recognition unit 102 may recognize that a drag operation has been performed at a display position corresponding to the position of the finger of the right hand.

Furthermore, the hand-shape recognition unit 102 is capable of recognizing that the left and right hand shapes have been switched by the operator 2. It can be cited as an effect of the above that when, in the middle of an operation, the operator 2 feels fatigue in one hand or both hands, the operator 2 can ease the fatigue by switching the left and right hand shapes.

Figure 7:
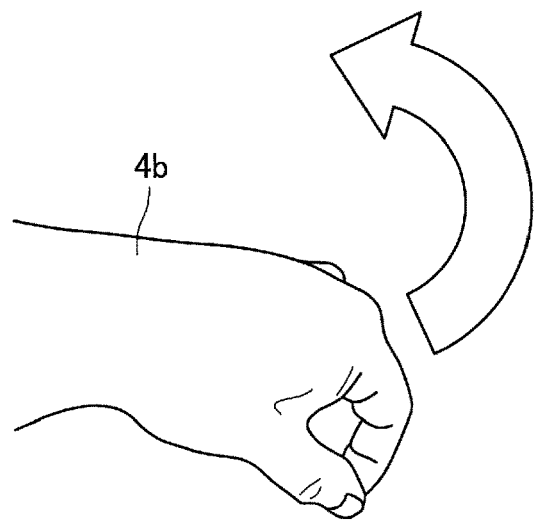
FIG. 7 is an explanatory drawing illustrating an example of a motion that displays the UI panel according to the same embodiment.

The motion recognition unit 104 recognizes the hand motion of the operator 2 on the basis of an image taken by the imaging unit 120, management information such as depth information measured by the sensor unit 122, and learning data of the hand shape prestored in the storage unit 110 described later. More specifically, the motion recognition unit 104 recognizes a normal rotation of the hand of the operator 2 (hereinafter, also referred to as a motion rotating the hand in the first direction). For example, when the hand shape of the left hand of the operator 2 is formed in a hand shape 4b in which the hand is closed as illustrated in FIG. 7, the motion recognition unit 104 recognizes the normal rotational motion of the hand by calculating the rotation angle of the left hand on the basis of the learning data of each of the rotation amounts of the hand shape 4b stored in the storage unit 110. Furthermore, the motion recognition unit 104 recognizes an inverse rotational motion of the hand of the operator 2 (hereinafter, also referred to as a motion of rotating the hand in the second direction). Note that the first direction may be for example, as illustrated in FIG. 7, a direction in which the left hand is rotated so that the thumb oriented downwards is oriented upwards. Furthermore, the second direction is a direction opposite to the first direction.

When the hand shape of the operator 2 is a predetermined shape, the display control unit 106 moves the display position of the UI panel 30 on the display screen 20 in accordance with the change in the position of the hand of the operator 2. For example, when the operator 2 moves the left hand upwards while the hand shape of the left hand is the predetermined shape, the display control unit 106 is capable of moving the UI panel 30 in the up direction of the display screen 20. For example, when the operator 2 moves the left hand forward while the hand shape of the left hand is the predetermined shape, the display control unit 106 is capable of displaying the UI panel 30 in a reduced manner so as to move the UI panel 30 in the depth direction of the display screen 20. For example, when the operator 2 moves the left hand to the rear, that is, when the operator 2 moves the left hand to a direction that brings the left hand near the operator 2, while the hand shape of the left hand is the predetermined shape, the display control unit 106 is capable of displaying the UI panel 30 in an enlarged manner. Note that the predetermined shape may be set to the hand shape 4a holding the UI panel 30 or may be set to other shapes, for example.

Furthermore, the display control unit 106 switches between displaying and hiding the UI panel 30 on the display screen 20 on the basis of a recognition result of the motion recognition unit 104 on the hand motion of the operator 2. For example, when a normal rotational motion of the hand of the operator 2 is recognized by the motion recognition unit 104, the display control unit 106 is capable of displaying the UI panel 30 at a position on the display screen 20 corresponding to the position of the hand of the operator 2 after the rotation. Furthermore, while the UI panel 30 is displayed on the display screen 20, when an inverse rotational motion of the hand of the operator 2 is recognized by the motion recognition unit 104, the display control unit 106 is capable of hiding the UI panel 30.

Herein, details of moving the UI panel 30 with the display control unit 106 described above will be described in detail. According to the positional relationship between the left hand and the right hand, the display control unit 106 is capable of changing the ratio of the amount of movement of the UI panel 30 on the display screen 20 to the amount of change in the position of the left hand. More specifically, in a case in which the left hand is in front of the right hand, the smaller the distance between the left hand and the right hand of the operator 2 in the front-rear direction, the display control unit 106 is capable of reducing the ratio of the amount of movement of the UI panel 30 on the display screen 20 to the amount of change in the position of the left hand. For example, in a case in which a ratio of the amount of movement of the UI panel 30 on the display screen 20 to the amount of change in the position of the left hand is set at 50% in the initial state, as the distance between the left hand and the right hand becomes smaller, the ratio of the amount of movement of the UI panel 30 may be gradually reduced such as 50%→40%→30%. Furthermore, when the distance between the left hand and the right hand becomes smaller than a predetermined distance, the ratio of the amount of movement of the UI panel 30 may be set at 0%, in other words, the display position of the UI panel 30 may be fixed.

As an effect of the above, there is an advantage in that when the operator 2 is selecting, for example, the icon 300 illustrated in FIG. 2 with the left hand, the position of the UI panel 30 can be suppressed from shifting even when the left hand slightly moves against the will of the operator 2 such that the operator 2 can select the icon 300 in a further accurate manner.

Note that the HMD 10 may preset the ratio of the amount of movement of the UI panel 30 to the amount of change in the hand position such that the ratios are different between the left hand and the right hand. For example, the HMD 10 may set the ratio of the amount of movement of the UI panel 30 to the amount of change in the hand position such that the ratio of the right hand, that is, the hand that performs selection on the UI panel 30, is lower than the ratio of the left hand, that is, the hand that holds the UI panel 30. As an effect of the above, there is an advantage in that when the operator 2 is selecting the icon 300, the icon 300 can be selected in a further accurate manner without moving the right hand so much.

Furthermore, when the hand-shape recognition unit 102 does not recognize that the hand shape of the operator 2 is a predetermined shape, the display control unit 106 is capable of not displaying the UI panel 30 on the display screen 20. Furthermore, the display control unit 106 is capable of superimposing, for example, a portion of the arm or body of the operator 2 that has been taken by the imaging unit 120 on the display screen 20.

When the hand-shape recognition unit 102 recognizes that the hand shape of the right hand of the operator 2 is, for example, a finger pointing shape, the determination unit 108 is capable of determining the details of the operation performed by the operator 2 on the basis of the position of the finger of the right hand. For example, when the hand-shape recognition unit 102 recognizes that the position of the finger of the right hand is in front of the position of the left hand, the determination unit 108 may determine that the position in the UI panel 30 corresponding to the position of the finger of the right hand is selected by the operator 2.

The storage unit 110 stores various information such as values including the ratio of the amount of movement of the UI panel 30 to the amount of change of the left hand position, the ratio of the amount of movement of the UI panel 30 to the amount of change of the right hand position, and image information of the display screen 20, which have been set in advance.

The output unit 112 displays the display screen 20 according to the instruction of the display control unit 106, for example.

Note that according to the first embodiment, a computer program for making the hardware such as the CPU 150, the ROM 152, and the RAM 154 that are built in the HMD 10 exert a similar function to each of the components of the HMD 10 described above may be provided. Furthermore, a storage medium in which the above computer program is stored is also provided.

(1-2-2. Imaging Unit 120)

The imaging unit 120 has a function of forming an image of an external image on an imagining element such as, for example, a charge coupled device (CCD) or a complementary metal oxide semiconductor (CMOS) through a lens to take a still image of a moving image. Furthermore, the imaging unit 120 sends the taken image to the HMD 10. Note that the imaging unit 120 is capable of being, as the sensor unit 122 illustrated in FIG. 1, for example, disposed on the HMD 10 so as to be positioned on the upper portion of the face of the operator 2.

(1-2-3. Sensor Unit 122)

The sensor unit 122 measures depth information of an external object such as the hand of the operator 2 with a depth sensor, for example. Furthermore, the sensor unit 122 sends the measured information to the HMD 10. Note that the sensor unit 122 is capable of being, as illustrated in FIG. 1, for example, disposed on the HMD 10 so as to be positioned on the upper portion of the face of the operator 2.

Note that the configuration according to the first embodiment is not limited to the configuration described above. For example, the HMD 10 may be provided therein with at least either one of the HMD 10, the imaging unit 120, and the sensor unit 122. Furthermore, either one of the imaging unit 120 and the sensor unit 122 may not be disposed.

[1-3. Operation]

(1-3-1. Overall Operation)

Figure 9:
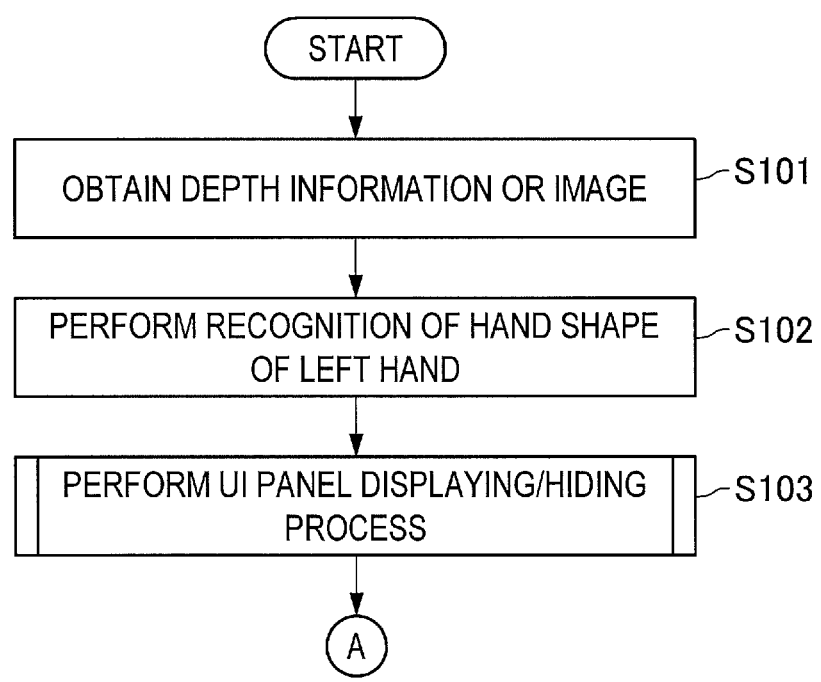
FIG. 9 is a flowchart illustrating a portion of an operation according to the same embodiment.

The configuration of the first embodiment has been described above. Subsequently, an operation according to the first embodiment will be described. FIG. 9 is a flowchart illustrating a portion of the operation of the first embodiment.

As illustrated in FIG. 9, first, the imaging unit 120 takes an image of the hand of the operator 2 and then sends the taken image to the HMD 10. Furthermore, the sensor unit 122 measures the information of the depth to the hand of the operator 2 and sends the measured depth information to the HMD 10 (S101).

Next, the hand-shape recognition unit 102 recognizes the hand shape of the left hand of the operator 2 on the basis of the image taken by the imaging unit 120 or the depth information measured by the sensor unit 122 (S102).

Next, the HMD 10 performs a "UI panel displaying/hiding process" (S103).

Figure 10:
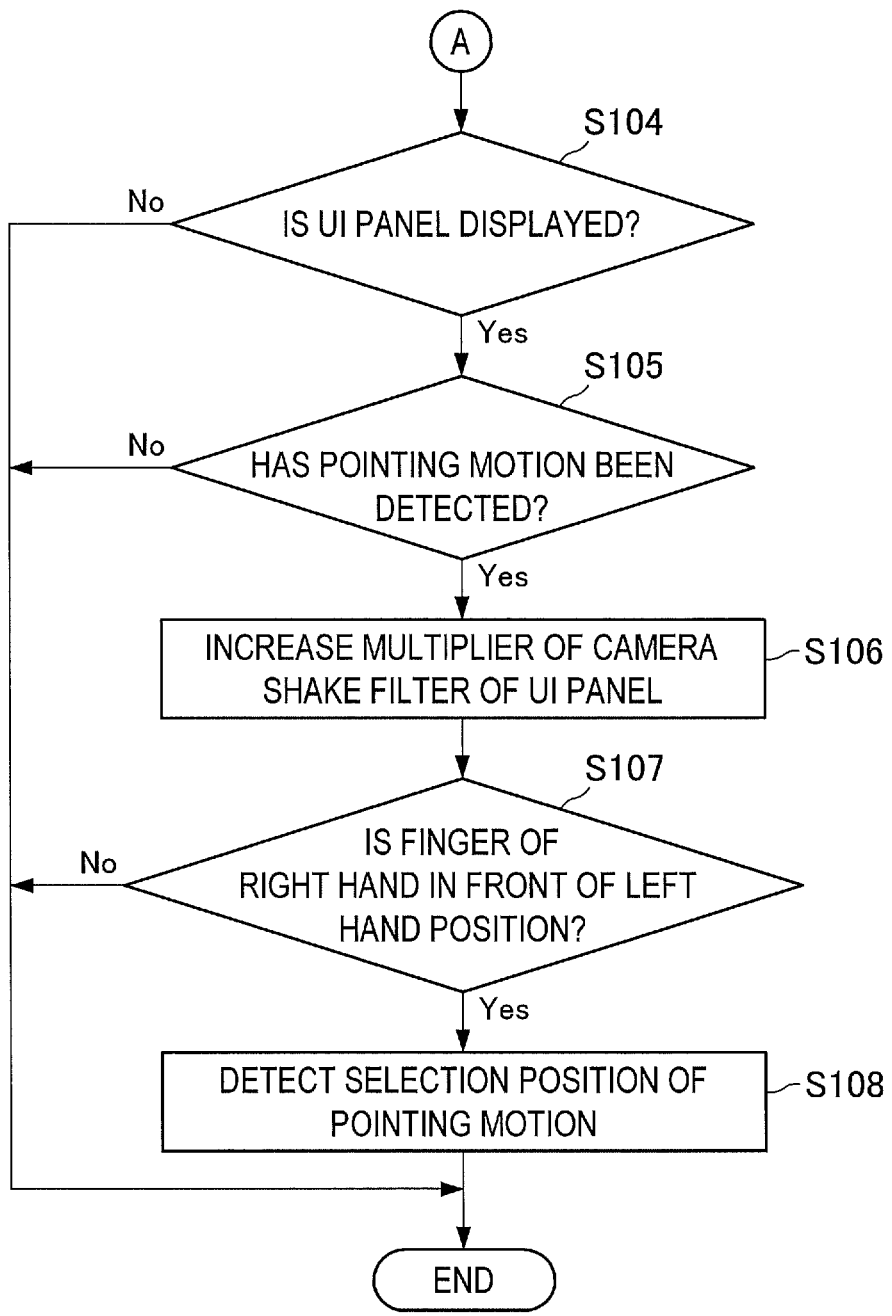
FIG. 10 is a flowchart illustrating a portion of the operation according to the same embodiment.

Next, referring to FIG. 10, an operation after S103 will be described. As illustrated in FIG. 10, after S103, the display control unit 106 checks whether the UI panel 30 is displayed on the display screen 20 (S104). When the UI panel 30 is not displayed (S104: No), the HMD 10 maintains the current operation.

Conversely, when the UI panel 30 is displayed (S104: Yes), the HMD 10 detects the pointing motion performed by the operator 2 (S105). More specifically, the hand-shape recognition unit 102 determines whether a pointing motion has been performed by the operator 2 by recognizing whether the hand shape of the right hand of the operator 2 is a finger pointing shape.

When no pointing motion performed by the operator 2 is detected (S105: No), the HMD 10 maintains the current operation. On the other hand, if a pointing motion performed by the operator 2 is detected (S105: Yes), the HMD 10 increases the multiplier of the camera shake filter of the UI panel 30 (S106). More specifically, the display control unit 106 lowers the ratio of the amount of movement of the UI panel 30 on the display screen 20 to the amount of change in the position of the left hand of the operator 2.

Next, the hand-shape recognition unit 102 recognizes whether the position of the finger of the right hand of the operator 2 is in front of the left hand (S107). When the position of the finger of the right hand is behind the position of the left hand (S107: No), the HMD 10 maintains the current operation.

Conversely, when the position of the finger of the right hand is in front of the position of the left hand (S107: Yes), the HMD 10 detects the selected position of the pointing motion (S108). More specifically, the determination unit 108 determines that the position of the UI panel 30 corresponding to the position of the finger of the right hand has been selected by the operator 2.

Furthermore, for example, when the position selected by the pointing motion is the display position of the icon 300, the HMD 10 is capable of starting the application corresponding to the selected icon 300.

(1-3-2. First Operation Example of UI Panel Displaying/Hiding Process)

Figure 11:
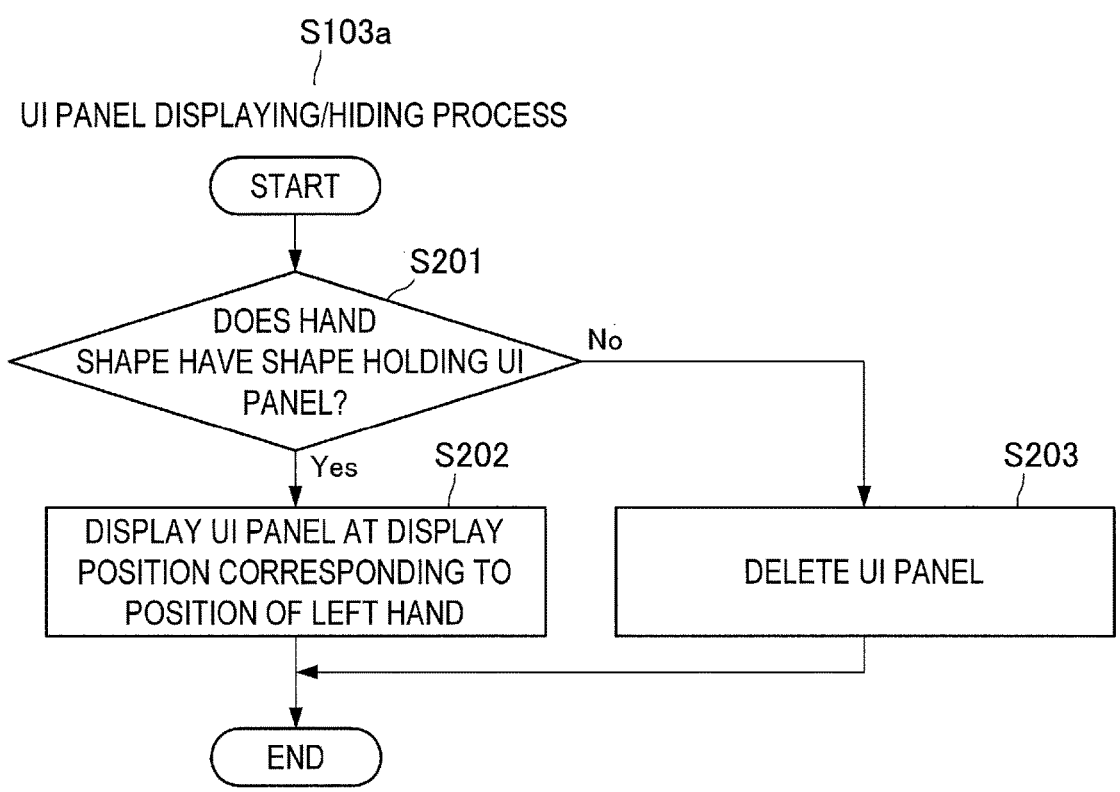
FIG. 11 is a first flowchart illustrating a displaying/hiding process of the UI panel according to the same embodiment in detail.

Subsequently, details of the UI panel displaying/hiding process of S103 will be described. Referring first to FIG. 11, a description of a first operation example of the UI panel displaying/hiding process will be given.

As illustrated in FIG. 11, first, the hand-shape recognition unit 102 recognizes whether the hand shape of the left hand of the operator 2 is a hand shape holding the UI panel 30 (S201). When the hand shape of the left hand is a hand shape holding the UI panel 30 (S201: Yes), the display control unit 106 displays the UI panel 30 at a position on the display screen 20 corresponding to the position of the left hand of the operator 2 (S202). Conversely, if the hand shape of the left hand is not a hand shape holding the UI panel 30 (S201: No), the display control unit 106 hides the UI panel 30 on the display screen 20 (S203).

According to the first operation example, it is possible to display the UI panel 30 by just forming the hand shape of the left hand of the operator 2 into a hand shape holding the UI panel 30, the UI panel 30 can be displayed easily and the display position of the UI panel 30 can be moved easily.

(1-3-3. Second Operation Example of UI Panel Displaying/Hiding Process)

Figure 12:
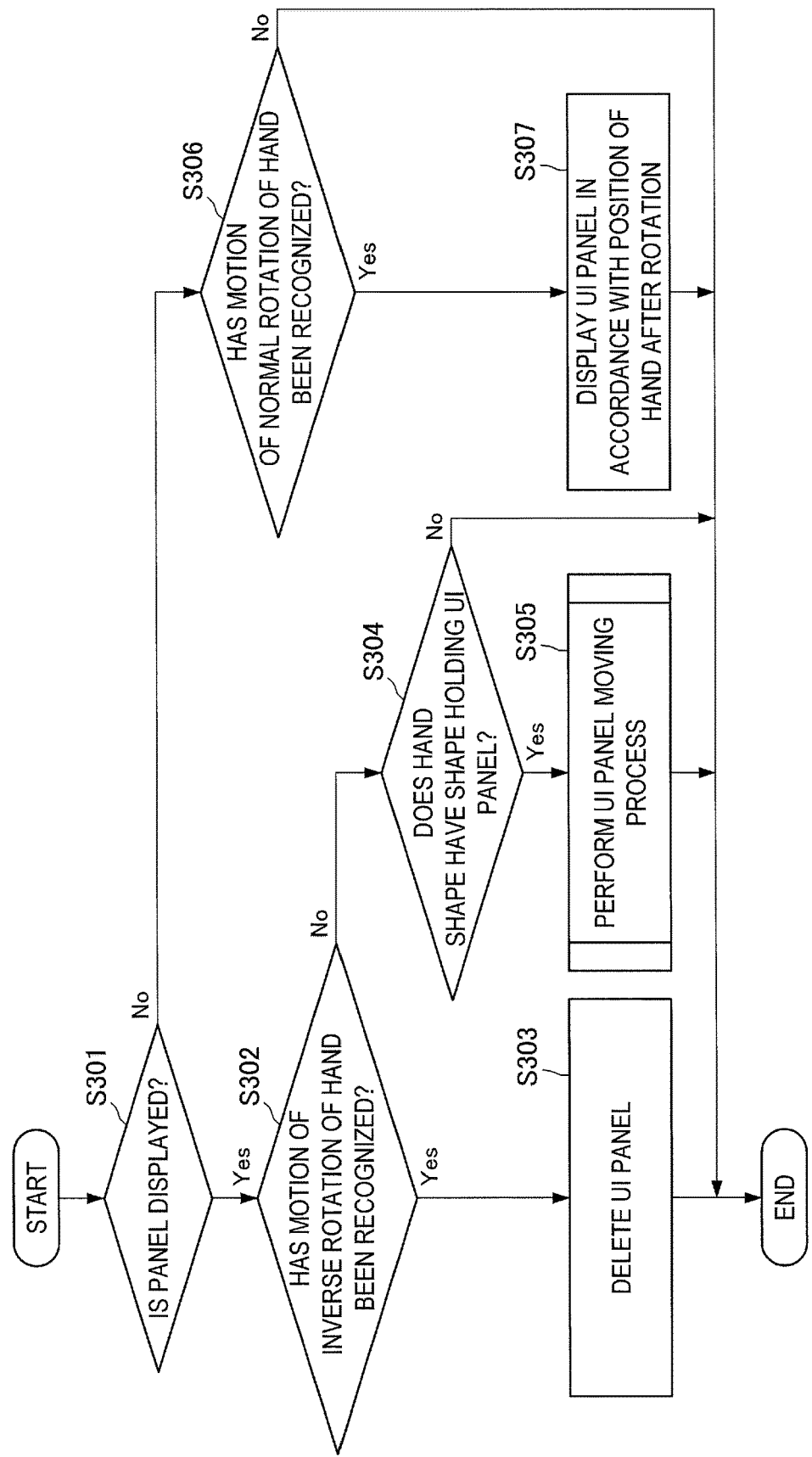
FIG. 12 is a second flowchart illustrating a displaying/hiding process of the UI panel according to the same embodiment in detail.

Referring next to FIG. 12, a description of a second operation example of the UI panel displaying/hiding process will be given. As illustrated in FIG. 12, first, the display control unit 106 checks whether the UI panel 30 is displayed on the display screen 20 (S301).

When the UI panel 30 is displayed (S301: Yes), the motion recognition unit 104 checks whether there has been an inverse rotational motion of the hand of the operator 2, in other words, whether there has been a motion of rotating the hand in the second direction (S302). When an inverse rotational motion of the hand of the operator 2 is recognized (S302: Yes), the display control unit 106 hides the UI panel 30 on the display screen 20 (S303).

Conversely, when no inverse rotational motion of the hand of the operator 2 is recognized (S302: No), the hand-shape recognition unit 102 recognizes whether the hand shape of the left hand of the operator 2 is a hand shape holding the UI panel 30 (S302). When the hand shape of the left hand is a hand shape holding the UI panel 30 (S304: Yes), the HMD 10 performs a "UI panel moving process" described later (S305). Conversely, if the hand shape of the left hand is not a hand shape holding the UI panel 30 (S304: No), the HMD 10 ends the UI panel displaying/hiding process.

Figure 13:
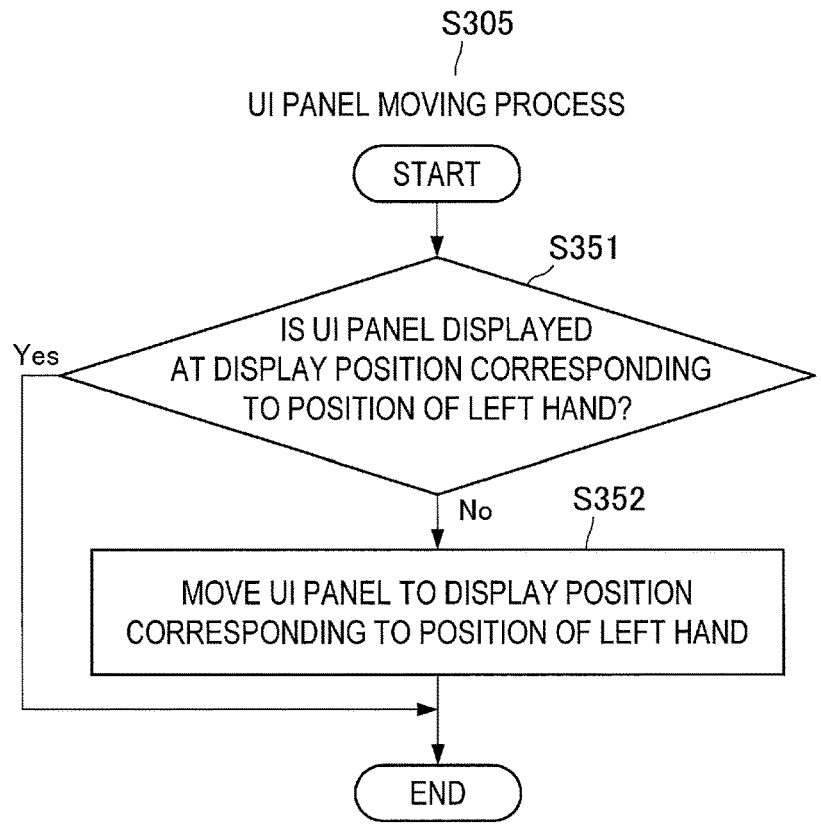
FIG. 13 is a flowchart that illustrates a moving process of the UI panel according to the same embodiment in detail.

Referring further to FIG. 13, details of the UI panel moving process of S305 will be described now. As described in FIG. 13, first, the display control unit 106 checks whether the UI panel 30 is displayed at a position on the display screen 20 corresponding to the position of the left hand of the operator 2 (S351). Then, if the UI panel 30 is not displayed at a position on the display screen 20 that corresponds to the position of the left hand (S351: No), the display control unit 106 moves the UI panel 30 to a position on the display screen 20 corresponding to the position of the left hand (S352).

Referring back to FIG. 12, the description of the second operation example will be continued now. In S301, when the UI panel 30 is not displayed (S301: No), the motion recognition unit 104 checks whether a normal rotational motion of the hand of the operator 2 has been performed, in other words, whether a motion of rotating the hand to the first direction has been performed (S306). When a normal rotational motion of the hand of the operator 2 is recognized (S306: Yes), the display control unit 106 displays the UI panel 30 at a position on the display screen 20 corresponding to the position of the hand of the operator 2 after the rotation (S307). Conversely, if no normal rotational motion of the hand of the operator 2 is recognized (S306: No) the HMD 10 ends the UI panel displaying/hiding process.

According to the second operation example, while the UI panel 30 is displayed, unless a predetermined motion such as the inverse rotational motion of the hand of the operator 2 is performed, the HMD 10 keeps on displaying the UI panel 30. Accordingly, even if the operator 2 changes the hand shape of the left hand or draws back the left hand, the UI panel 30 can be kept displayed, thus, there is an advantage in that the operator 2 can operate the UI panel 30 in a further comfortable position. Furthermore, after the UI panel 30 is displayed, the operator 2 is capable of performing operation on the UI panel 30 with just the left hand, that is, with just a single hand, by changing the hand shape of the left hand to, for example, a finger pointing shape 6a.

(1-3-4. Modifications)

While the operation of the first embodiment has been described above, the first embodiment is not limited to the operation described above. For example, in S103, depending on the type and the display content of the UI panel 30, the HMD 10 may determine which to adopt between the first operation example illustrated in FIG. 11 and the second operation example illustrated in FIG. 12. More specifically, the display control unit 106 may adopt the first operation example in a case in which the information amount included in the UI panel 30 is small and for an operation object that is supposed to be temporarily displayed, such as a search window. The reason for the above is that the first operation example is a lighter process and is a more simple operation. Furthermore, the display control unit 106 may adopt the second operation example in case in which the information amount included in the UI panel 30 is large and for an operation object that is desirably displayed for a long time, such as a route guide display to the destination. The reason for the above is that in the second operation example, it is possible to continuously display the operation object unless a predetermined motion is performed by the operator 2.

[1-4. Effect]

As described above with reference to FIGS. 4, 9 to 13, and the like, for example, in the HMD 10 according to the first embodiment, the hand shape of the operator 2 is recognized on the basis of the measured information related to the hand of the operator 2, and when the hand shape of the left hand of the operator 2 is a predetermined shape, the display position of the UI panel 30 on the display screen 20 is moved according to the change in the position of the left hand of the operator 2. Accordingly, since the position of the UI panel 30 can be changed to a position that is easy to operate by moving the left hand of the operator 2, the HMD 10 can reduce the physical load on the operator 2. For example, since the operator 2 can dispose the UI panel 30 at a position that is easy to perform the pointing operation of the right hand, even if operating for a long period of time, there will be scarcely any physical pain.

Furthermore, as described with reference to FIGS. 12 to 13, and the like, for example, when a normal rotational motion of the hand of the operator 2 is recognized, the HMD 10 is capable of displaying the UI panel 30 at a position on the display screen 20 corresponding to the position of the hand of the operator 2 after the rotation. Furthermore, while the operation object is displayed, when an inverse rotational motion of the hand of the operator 2 is recognized, the HMD 10 is capable of hiding the UI panel 30 on the display screen 20. Accordingly, while the UI panel 30 is displayed, since the UI panel 30 can be kept displayed even if the operator 2 changes the hand shape of the left hand or draws back the left hand, the operator 2 can operate the UI panel 30 in a further comfortable position.

Furthermore, the HMD 10 is capable of setting the ratio of the amount of movement of the UI panel 30 to the amount of change in the hand position such that the ratio for the right hand is lower than the ratio of the left hand. Accordingly, when selecting the icon 300, the operator 2 is capable of collecting the desired icon 300 without greatly moving the right hand.

Furthermore, in a case in which the left hand is in front of the right hand, the smaller the distance between the left hand and the right hand of the operator 2 in the front-rear direction, the HMD 10 is capable of reducing the ratio of the amount of movement of the UI panel 30 to the amount of change in the position of the left hand. Accordingly, when the operator 2 performs a pointing motion to select an icon 300, even if the left hand moves against the will of the operator 2, the HMD 10 can suppress the position of the UI panel 30 from being shifted. Accordingly, the operator 2 can select the icon 300 more easily and in an accurate manner.

Furthermore, the HMD 10 is capable of superimposing, for example, a portion of the arm or body of the operator 2 that has been taken by the imaging unit 120 on the display screen 20. Accordingly, the operator 2 can easily recognize that he/she is performing an operation and, thus, the operator 2 can intuitively perform the operation.

2. Detailed Description of Second Embodiment

The first embodiment has been described above. As described above, in the first embodiment, the operator 2 uses both hands to operate the UI panel 30. As described next, according to a second embodiment, the operator 2 is capable of operating the UI panel 30 with just one hand.

[2-1. Configuration]

The HMD 10 according to the second embodiment includes components that are similar to those of the HMD 10 according to the first embodiment illustrated in FIG. 4. Accordingly, points that are different from the first embodiment will be mainly described herein.

Figure 14:
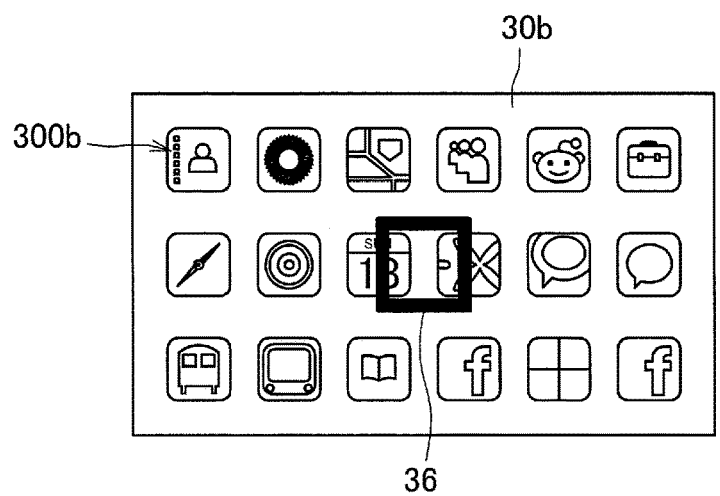
FIG. 14 is an explanatory drawing illustrating a display example of the UI panel and a focus frame according to a second embodiment of the present disclosure.
Figure 15:
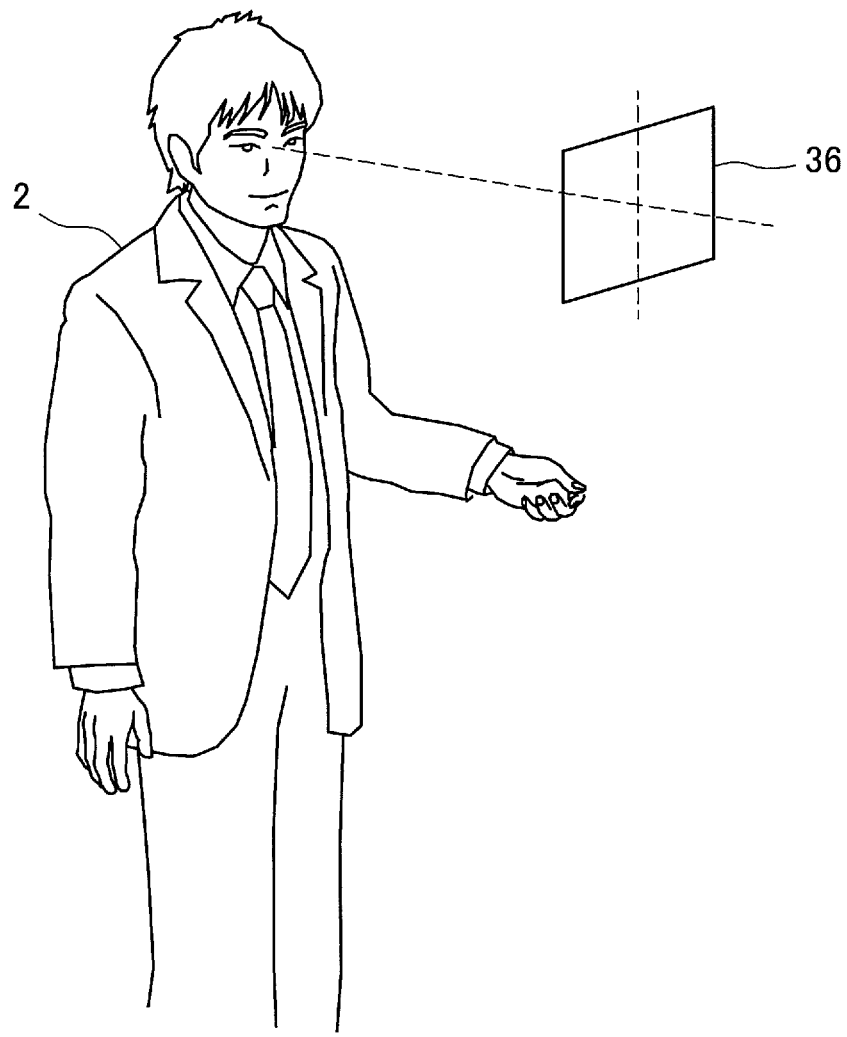
FIG. 15 is an external view illustrating a person operating a UI panel according to the same embodiment.

The display control unit 106 according to the second embodiment displays a focus frame 36 at a position on the display screen 20 corresponding to the position of the point of view of the operator 2. For example, as illustrated in FIG. 14, the display control unit 106 is capable of displaying the UI panel 30b and the focus frame 36 separately and displaying the focus frame 36 at a position on the front side with respect to the UI panel 30b. Furthermore, as illustrated in FIG. 15, the display control unit 106 is capable of disposing the focus frame 36 at a height that is about the same as the height of the eyes of the operator in real space and at a position that is in front of the eyes of the operator.

Figure 16:
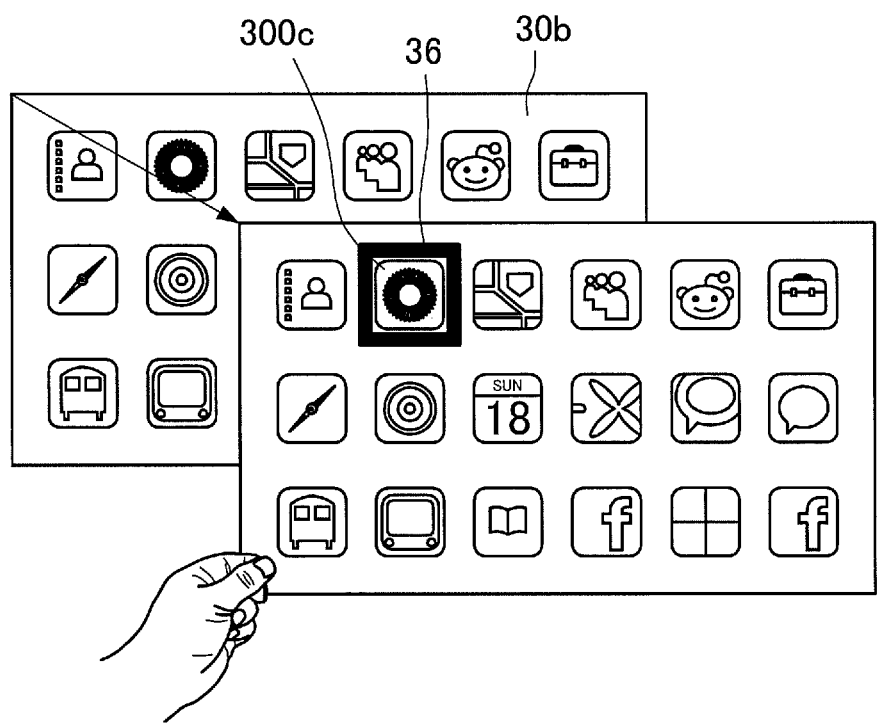
FIG. 16 is an explanatory drawing illustrating an operation example according to the same embodiment.

The focus frame 36 is an object used to select an icon, a button, an image, text, and the like that are displayed on the display screen 20, for example. Referring to FIG. 16, an exemplary method of operating the UI panel 30 according to the second embodiment will be described now. The operator 2 can move the display position of the UI panel 30 on the display screen 20 by moving the position of the left hand up, down, left, and right. Meanwhile, the position of the focus frame 36 is generally fixed on the display screen 20. Accordingly, as illustrated in FIG. 16, when the operator 2 desires to select an icon 300c, for example, the operator 2 can select the icon 300c by moving the UI panel 30b in the lower right direction in FIG. 16 so that the icon 300c is inside the focus frame 36.

Furthermore, when the display position of the UI panel 30 is moved, the determination unit 108 according to the second embodiment determines that the operator 2 has selected an area corresponding to the focus frame 36 on the UI panel 30 after the movement. For example, in the example illustrated in FIG. 16, after the UI panel 30 is moved so that the icon 300c is inside the focus frame 36, the determination unit 108 determines that the icon 300c has been selected by the operator 2.

[2-2. Operation]

Figure 17:
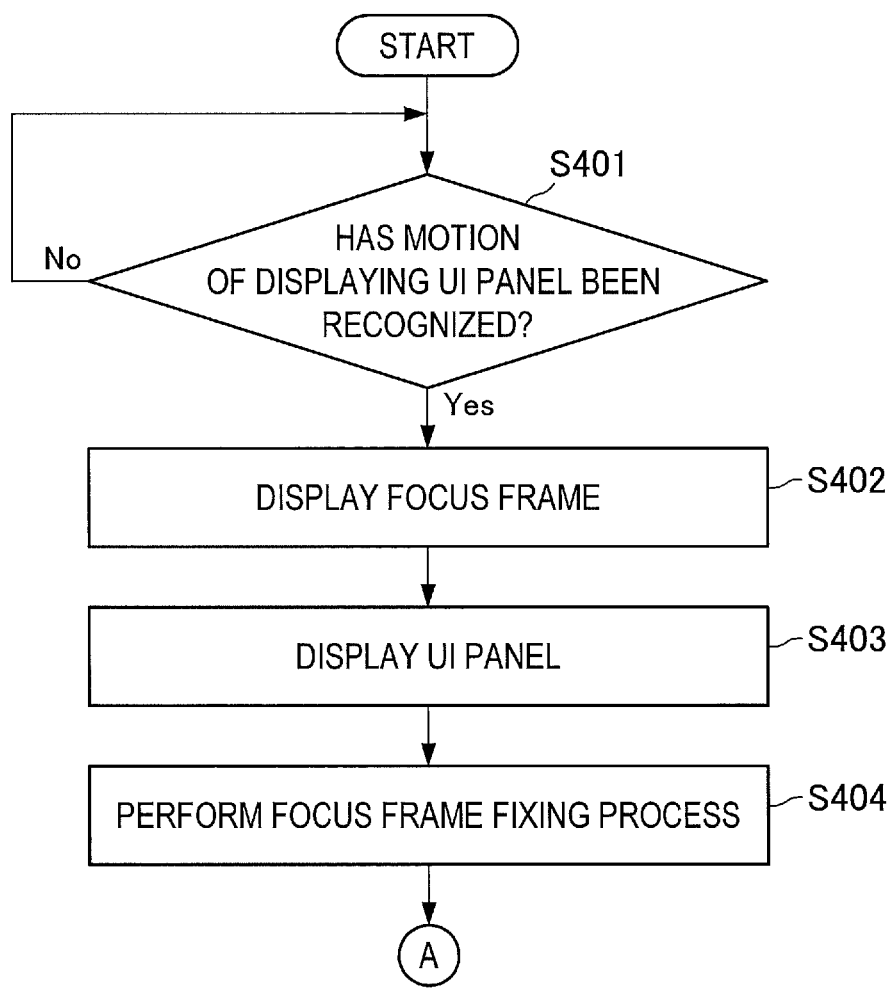
FIG. 17 is a flow chart illustrating a portion of an operation according to the same embodiment.

The configuration of the second embodiment has been described above. Subsequently, an operation according to the second embodiment will be described. FIG. 17 is a flowchart illustrating a portion of the operation of the second embodiment.

As illustrated in FIG. 17, first, the controller 100 determines whether a motion of displaying the UI panel 30 has been performed by the operator 2 (S401). For example, whether the motion of displaying the UI panel 30 has been performed by the operator 2 may be determined by having the motion recognition unit 104 recognize whether the normal rotational motion of the left hand has been performed by the operator 2 as in S306 in FIG. 12. Furthermore, whether the motion of displaying the UI panel 30 has been performed by the operator 2 may be determined by having the hand-shape recognition unit 102 recognize whether the hand shape of the left hand of the operator 2 is a hand shape holding the UI panel 30 as in S201 in FIG. 11.

When it is determined that the motion of displaying the UI panel 30 has been performed (S401: Yes), the display control unit 106 displays the focus frame 36 at a position on the display screen 20 corresponding to the position of the point of view of the operator 2 (S402).

Next, the display control unit 106 displays the UI panel 30 on the display screen 20 (S403). Note that in S401, when a normal rotational motion of the left hand of the operator 2 is recognized by the motion recognition unit 104, the display control unit 106 may display the UI panel 30 at a position on the display screen 20 corresponding to the position of the left hand of the operator 2 after the rotation.

Next, the display control unit 106 fixes the display position of the focus frame 36 on the display screen 20 (S404).

Figure 18:
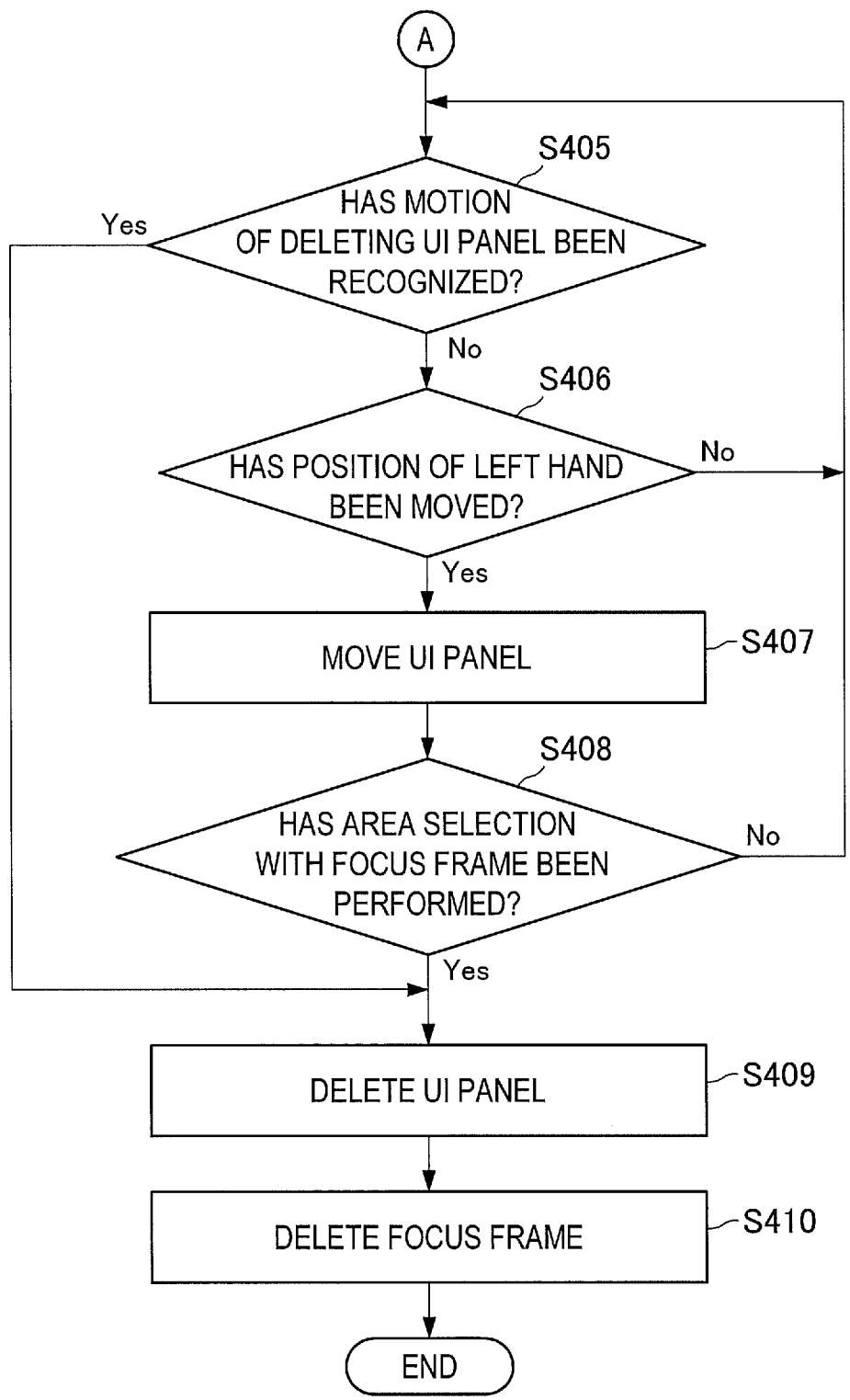
FIG. 18 is a flow chart illustrating a portion of the operation according to the same embodiment.

Next, referring to FIG. 18, an operation after S404 will be described. As illustrated in FIG. 18, after S404, the controller 100 determines whether a motion of deleting the UI panel 30 has been performed by the operator 2 (S405). For example, whether the motion of deleting the UI panel 30 has been performed by the operator 2 may be determined by having the motion recognition unit 104 recognize whether the inverse rotational motion of the left hand has been performed by the operator 2 as in S302 in FIG. 12. Furthermore, whether the motion of deleting the UI panel 30 has been performed by the operator 2 may be determined through recognition by the hand-shape recognition unit 102 that the hand shape of the left hand of the operator 2 is not a hand shape holding the UI panel 30 as in S201 in FIG. 11.

When a determination is made that the motion of deleting the UI panel 30 has been performed (S405: Yes), the HMD 10 performs the operation of S409 described later. Conversely, when a determination is made that the motion of deleting the UI panel 30 has not been performed (S405: No), the hand-shape recognition unit 102 recognizes whether the hand shape of the left hand of the operator 2 is a hand shape holding the UI panel 30 and whether the position of the left hand has been moved (S406). When the hand shape of the left hand is not a hand shape holding the UI panel 30, or when the position of the left hand has not been moved (S406: No), the HMD 10 repeats the operation of S405. Conversely, when the hand shape of the left hand is a shape holding the UI panel 30 and when the position of the left hand is moved (S406: Yes), the HMD 10 moves the display position of the UI panel 30 on the display screen 20 (S407).

Next, the determination unit 108 determines whether the area corresponding to the focus frame 36 on the UI panel 30 has been selected by the operator 2 (S408). For example, the determination unit 108 may determine whether the selection of the area with the focus frame 36 has been performed by the operator 2 by determining whether a predetermined time has elapsed while an icon 300, a button, or the like is in the focus frame 36.

When it is determined that the selection of the area with the focus frame 36 has not been performed (S408: No), the HMD 10 repeats the operation of S405. Conversely, when it is determined that the selection of the area with the focus frame 36 has been performed (S408: Yes), the controller 100 executes a predetermined process such as starting an application corresponding to the selected icon 300, for example. Furthermore, the display control unit 106 deletes the UI panel 30 on the display screen 20 (S409).

Subsequently, the display control unit 106 deletes the focus frame 36 on the display screen 20 (S410).

—Modification—

Note that the operation according to the second embodiment is not limited to the operation described above. For example, the display control unit 106 may display the focus frame 36 on the display screen 20 regardless of the operation of displaying the UI panel 30 by the operator 2. For example, the display control unit 106 may display the focus frame 36 at all times or display the focus frame 36 when a predetermined motion has been made by the operator 2.

Furthermore, after S408, when a predetermined motion of the operator 2 is recognized by the hand-shape recognition unit 102 or the motion recognition unit 104, the determination unit 108 may determine that the selection of the area of S408 has been canceled by the operator 2. For example, when the inverse rotational motion of the left hand of the operator 2 is recognized by the motion recognition unit 104 or when the hand shape of the left hand of the operator 2 is recognized as not being the hand shape holding the UI panel 30 by the hand-shape recognition unit 102, the determination unit 108 may determine that the selection of the area has been canceled by the operator 2.

Furthermore, after S408, instead of performing the operation of S409 and after, the HMD 10 may repeat the operation of S405 again. Furthermore, after S409, instead of performing the operation of S410, the HMD 10 may repeat the operation of S401 again.

[2-3. Effects]

As described above with reference to FIGS. 17 and 18, and the like, for example, the HMD 10 according to the second embodiment displays the focus frame 36 at a position on the display screen 20 corresponding to the position of the point of view of the operator 2, and when the display position of the UI panel 30 is moved, determines that the area corresponding to the focus frame 36 on the UI panel 30 after the movement has been selected by the operator 2. Accordingly, when the operator 2 moves the position of the left hand to move the UI panel 30 so that the desired area to be selected on the UI panel 30 is inside the focus frame 36, the operator 2 can select the desired area. Accordingly, the operator 2 is capable of operating the UI panel 30 with only a single hand and can easily operate the UI panel 30.

3. Detailed Description of Third Embodiment

The second embodiment has been described above. As described above, in the first embodiment and the second embodiment, the HMD 10 displays the display screen 20 and the UI panel 30. As described subsequently, according to a third embodiment, the video device 40 such as a television receiver, for example, displays the display screen 20 and the UI panel 30.

[3-1. Basic Configuration]

The basic configuration of the video device 40 (the information processing apparatus) according to a third embodiment will be described with reference to FIG. 19. The video device 40 is a device for displaying a display screen 20 as illustrated in FIG. 2, for example. Note that the video device 40 may be a liquid crystal display device, an OLED device, a plasma display device, or the like. Furthermore, the display screen 20 displayed by the video device 40 may be the display screen 20 displayed by the HMD 10 according to the first embodiment or may be a different screen.

As illustrated in FIG. 19, the operator 2 is basically positioned in front of the video device 40 and is capable of operating an operation object such as, for example, the UI panel 30 while viewing the display of the video device 40. Similar to the HMD 10, the video device 40 can change the display position of the UI panel 30 on the display screen 20 by recognizing the hand shape and the hand position of the operator 2 on the basis of information obtained through an imaging unit 420 or a sensor unit 422 described later. Furthermore, by recognizing the hand motion of the operator 2, the video device 40 is capable of recognizing the operation performed by the operator 2 selecting an icon 300, a button, and image, text, and the like and, further, is capable of executing a predetermined process corresponding to the selection operation, such as starting an application corresponding to the selected icon 300, for example.

Note that in FIG. 19, although an example in which the operator 2 operates the UI panel 30 while standing is described, not limited to the above, the operator 2 can operate the UI panel 30 while sitting on a seat, for example. Furthermore, the hardware configuration of the video device 40 may be similar to the hardware configuration of the HMD 10 according to the first embodiment illustrated in FIG. 3.

[3-2. Configuration]

(3-2-1. Video Device 40)

Figure 20:
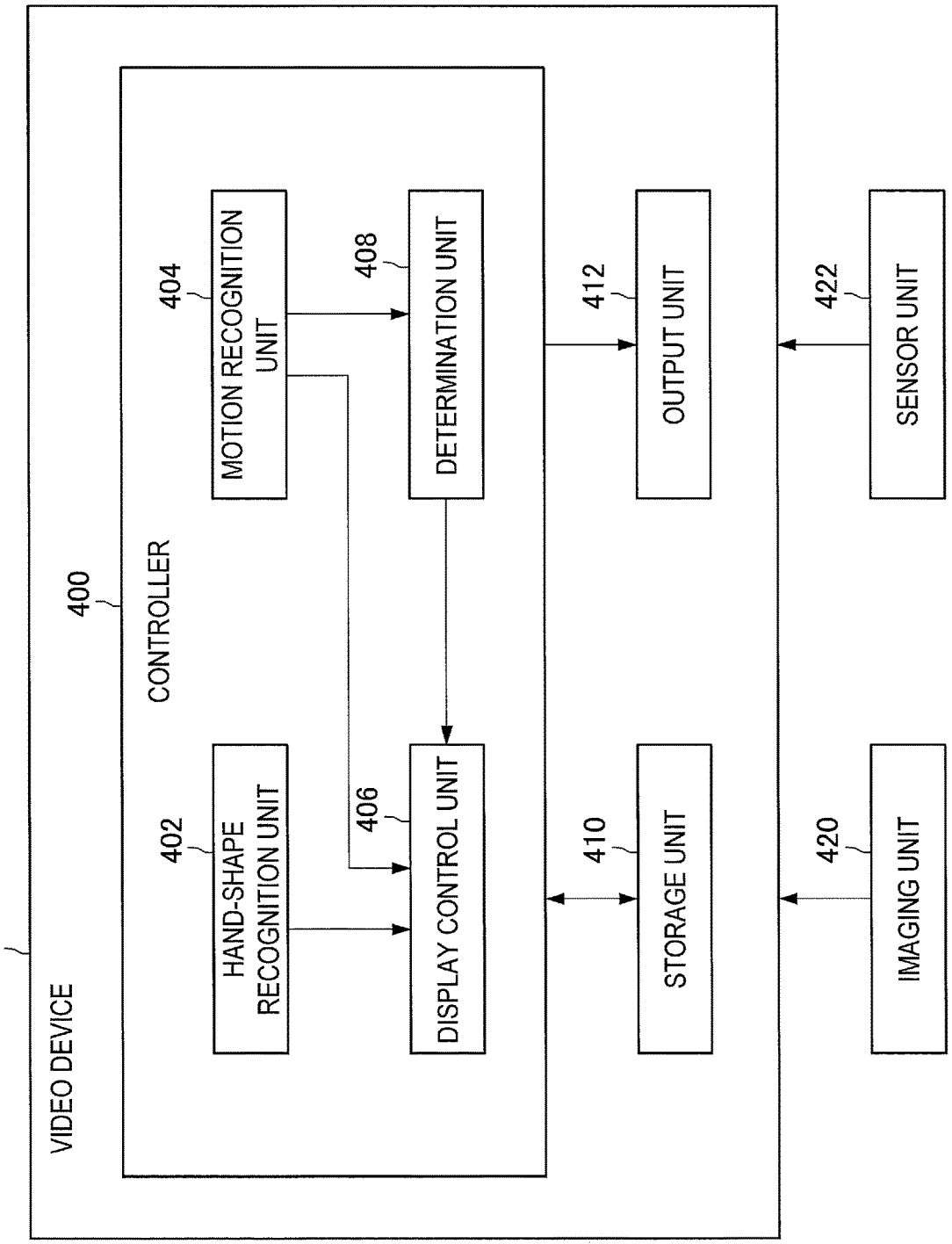
FIG. 20 is a functional block diagram illustrating a configuration of a video device according to the same embodiment.

The basic configuration of the video device 40 of the third embodiment has been described above. Subsequently, a configuration according to the third video device 40 embodiment will be described in detail. FIG. 20 is a functional block diagram illustrating a configuration of the video device 40 according to the third embodiment. As illustrated in FIG. 20, the video device 40 includes a controller 400, a storage unit 410, and an output unit 412. Furthermore, the controller 400 includes a hand-shape recognition unit 402, a motion recognition unit 404, a display control unit 406, and a determination unit 408. Note that the function of each component is generally similar to that of the corresponding component of the HMD 10 according to the first embodiment. Accordingly, points that are different from the first embodiment will be mainly described herein.

As illustrated in FIG. 19, in the third embodiment, the operator 2 operates the UI panel 30 while being away from the video device 40 at a certain distance. Accordingly, when the hand of the operator 2 is on an extended line connecting the point of view of the operator 2 and the UI panel 30, as illustrated in FIG. 21, for example, an area in the UI panel 30 that is shielded by the hand of the operator 2 and that cannot be viewed by the operator 2 may be created.

Accordingly, when the hand of the operator 2 is positioned in the space between the display of the video device 40 and the eyes of the operator 2, as the UI panel 30a in FIG. 22, for example, the display control unit 406 is capable of displaying the UI panel 30 in an area in the display screen 20 that is different from the area shielded by the hand of the operator 2 from the view of the operator 2. For example, on the basis of relative positional information of the face and hand of the operator 2 with respect to the video device 40 that is measured by the sensor unit 422, the display control unit 406 may compute the area in the display screen 20 that is shielded by the hand of the operator 2 from the view of the operator 2. Then, the display control unit 406 may display the UI panel 30 in the area that is different from the computed area.

Note that when the UI panel 30 is displayed in a shifted manner in the display screen 20, it may become difficult for the operator 2 to operate the UI panel 30. Accordingly, as an image 32 of the left hand and an image 34 of the right hand in FIG. 22, for example, the display control unit 406 is capable of displaying and superimposing virtual hand images on the display screen 20 at positions corresponding to the positions of the hand of the operator 2. Generally, it is said that about 80% of information that a person receives from the external environment is visual information and that a person tends to act based on visual information mainly. Accordingly, even if the UI panel 30 is displayed as in FIG. 22, by operating the UI panel 30 while viewing the images of the hands, ease of operation is not degraded and the operator 2 can operate the UI panel 30 accurately.

Note that in FIG. 22, while an example in which, as the image 32 of the left hand and the image 34 of the right hand, the virtual hand images are displayed by, for example, computer graphics, not limited to the above example, captured images of the hands and the upper body of the operator 2 taken with the imaging unit 420, for example, may be displayed and superimposed on the display screen 20. Furthermore, instead of displaying both of the image 32 of the left hand and the image 34 of the right hand, only either one of the images, such as the image 32 of the left hand only, for example, may be displayed.

(3-2-2. Imaging Unit 420 and Sensor Unit 422)

The functions of the imaging unit 420 and the sensor unit 422 are generally similar to the functions of the imaging unit 120 and the sensor unit 122, respectively, according to the first embodiment. Note that similar to the sensor unit 422 illustrated in FIG. 19, for example, the imaging unit 420 and the sensor unit 422 can be installed on the video device 40 so as to be positioned on the upper middle portion of the display in the horizontal direction.

Note that the configuration according to the first embodiment is not limited to the configuration described above. For example, the video device 40 may be provided therein with at least either one of the imaging unit 120 and the sensor unit 122. Furthermore, either one of the imaging unit 420 and the sensor unit 422 may not be disposed.

[3-3. Operation]

The configuration of the third embodiment has been described above. Subsequently, an operation according to the third embodiment will be described. The video device 40 according to the third embodiment is capable of performing operations that are generally similar to, for example, the operation of the first embodiment illustrated in FIGS. 9 to 13 and the operation of the second embodiment illustrated in FIGS. 17 to 18. Accordingly, description thereof is omitted herein.

[3-4. Effects]

As described above, in the video device 40 according to the third embodiment, the hand shape of the operator 2 is recognized on the basis of the measured information related to the hand of the operator 2, and when the hand shape of the left hand of the operator 2 is a predetermined shape, the display position of the UI panel 30 on the display screen 20 is moved according to the change in position of the left hand of the operator 2. Accordingly, similar to the first embodiment and the second embodiment, since the position of the UI panel 30 can be changed to a position that is easy to operate by moving the left hand of the operator 2, the video device 40 can reduce the physical load on the operator 2.

Furthermore, when the hand of the operator 2 is positioned in the space between the display and the eyes of the operator 2, the video device 40 displays the UI panel 30 in an area in the display screen 20 that is different from the area shielded by the hand of the operator 2 from the view of the operator 2. Accordingly, the video device 40 can prevent a portion of the UI panel 30 in the field of vision of the operator 2 to be hidden by the hand of the operator 2; accordingly, even if the operator 2 is positioned so as to oppose the display, the UI panel 30 can be operated without degrading the visibility.

Furthermore, since the video device 40 is a display device such as, for example, a television receiver or a display for a PC, the operator 2 can operate the UI panel 30 while viewing the display screen 20 displayed on the video device 40 together with, for example, other people such as friends and families. Furthermore, the operator 2 is capable of changing with another person to have the another person operate the UI panel 30, such that the operation of the UI panel 30 can be shared and enjoyed among a plurality of people.

4. Modifications

Note that while the preferred embodiments of the present disclosure have been described in detail with reference to the accompanying drawings, the present disclosure is not limited to such examples. It is obvious to a person skilled in the art of the present disclosure that various modifications and alterations can be conceived under the category of the technical idea described in the claims, and it can be understood that the modifications and alterations naturally belong to the technical scope of the present disclosure.

For example, the HMD 10 and the video device 40 are each capable of displaying different images, taking parallax into account, to the left eye and the right eye of the operator 2 with the display screen 20 or the UI panel 30. More specifically, the HMD 10 includes two displays, one for the left eye and one for the right eye, and it is capable of displaying an image for the left eye and an image for the right eye to the operator 2. Furthermore, the video device 40 may be a display device for a 3D display. Furthermore, the operator 2 is capable of viewing different images with the left eye and the right eye by mounting a special set of glasses and by viewing the display screen 20 displayed in the video device 40. According to the above modification, since the operator 2 can perceive the display screen 20 or the UI panel 30 in a further steric manner, the operator 2 can operate the UI panel 30 in a further intuitive manner.

Furthermore, the HMD 10 and the video device 40 are capable of allowing the operator 2 to change the sizes of the display screen 20 and the UI panel 30 by having the operator 2 perform an operation of selecting a predetermined button on the UI panel 30. With the above modification, the operator 2 can have the display screen 20 and the UI panel 30 displayed in sizes that facilitate operation in accordance with the body height and the size of the operating environment; accordingly, usability is improved.

Additionally, the present technology may also be configured as below.

(1)

An information processing apparatus including:

a hand-shape recognition unit configured to recognize a hand shape of an operator on a basis of measured information related to a hand of the operator; and a display control unit configured to move a display position of an operation object on a display screen according to a change in a position of the hand of the operator when the hand shape of the operator is a predetermined shape.

(2)

The information processing apparatus according to (1), wherein the predetermined shape is a shape holding the operation object.

(3)

The information processing apparatus according to (1) or (2), wherein the operation object is an operation surface for the operator to operate the display screen.

(4)

The information processing apparatus according to any one of (1) to (3), further including:

a motion recognition unit configured to recognize a hand motion performed by the operator, wherein the display control unit switches between displaying and hiding the operation object on the display screen on a basis of a recognition result of the motion recognition unit on the hand motion of the operator.

(5)

The information processing apparatus according to (4), wherein the hand motion is a motion of rotating the hand, and wherein when a motion of rotating the hand of the operator in a first direction is recognized by the motion recognition unit, the display control unit displays the operation object at a position on the display screen that corresponds to a position of the hand of the operator after rotation.

(6)

The information processing apparatus according to (5), wherein when a motion of rotating the hand of the operator in a second direction, the second direction being a direction opposite to the first direction, is recognized by the motion recognition unit while the operation object is displayed on the display screen, the display control unit hides the operation object on the display screen.

(7)

The information processing apparatus according to any one of (4) to (6), wherein a motion of rotating the hand is a motion of rotating one hand while the one hand is closed.

(8)

The information processing apparatus according to any one of (4) to (7), wherein when a hand shape of a first hand of the operator is the predetermined shape, the display control unit moves the display position of the operation object according to the change in a position of the first hand, and wherein the information processing apparatus further includes a determination unit configured to, when a hand shape of a second hand of the operator, the hand shape being recognized by the hand-shape recognition unit, is a finger pointing shape, determine a detail of an operation performed by the operator on a basis of a position of a finger of the second hand.

(9)

The information processing apparatus according to (8), wherein when the position of the finger of the second hand is recognized to be in front of the position of the first hand, the determination unit determines that a position in the operation object corresponding to the position of the finger of the second hand is selected by the operator.

(10)

The information processing apparatus according to (9), wherein a ratio of an amount of movement of the operation object on the display screen to an amount of change in the position of the hand is different between the first hand and the second hand.

(11)

The information processing apparatus according to (9) or (10), wherein the display control unit changes a ratio of an amount of movement of the operation object on the display screen to an amount of change in the position of the first hand in accordance with a positional relationship between the first hand and the second hand.

(12)

The information processing apparatus according to (11), wherein, in a case in which the first hand is in front of the second hand, as a distance between the first hand and the second hand in a front-rear direction of the operator becomes smaller, the display control unit reduces the ratio of the amount of movement of the operation object on the display screen to the amount of change in the position of the first hand.

(13)

The information processing apparatus according to any one of (1) to (3), wherein when the hand shape of the operator is not recognized as being the predetermined shape by the hand-shape recognition unit, the display control unit refrains from displaying the operation object on the display screen.

(14)

The information processing apparatus according to any one of (1) to (13), wherein when the hand of the operator is positioned in a space between a display that displays the display screen and an eye of the operator, the display control unit displays the operation object in an area in the display screen that is different from an area that is shielded by the hand of the operator from a view of the operator.

(15)

The information processing apparatus according to (3), wherein the display control unit displays a focus frame at a position on the display screen that corresponds to a position of a point of view of the operator, and wherein the information processing apparatus further includes a determination unit that, when a display position of the operation surface is moved, determines that an area on the operation surface after movement corresponding to the focus frame is selected by the operator.

(16)

The information processing apparatus according to any one of (1) to (15), wherein the display control unit displays an image of the hand at a position on the display screen corresponding to a position of the hand of the operator.

(17)

The information processing apparatus according to any one of (1) to (16),
wherein information related to the hand of the operator is a value corresponding to a distance from a display displaying the display screen to the hand of the operator or an image of the hand of the operator.

(18)

An information processing method including:
recognizing a hand shape of an operator on a basis of measured information related to a hand of the operator; and
moving a display position of an operation object on a display screen according to a change in a position of the hand of the operator when the hand shape of the operator is a predetermined shape.

(19)

A program for causing a computer to function as:
a hand-shape recognition unit configured to recognize a hand shape of an operator on a basis of measured information related to a hand of the operator; and
a display control unit configured to move a display position of an operation object on a display screen according to a change in a position of the hand of the operator when the hand shape of the operator is a predetermined shape.

REFERENCE SIGNS LIST

10 HMD
40 video device
100 controller
102 hand-shape recognition unit
104 motion recognition unit
106 display control unit
108 determination unit
110 storage unit
112 output unit
120 imaging unit
122 sensor unit
150 CPU
152 ROM
154 RAM
156 internal bus
158 interface
160 input device
162 output device
164 storage device
166 communication device
400 controller
402 hand-shape recognition unit
404 motion recognition unit
406 display control unit
408 determination unit
410 storage unit
412 output unit
420 imaging unit
422 sensor unit

The invention claimed is:

1. A head mounted display, comprising:
at least one sensor configured to obtain at least one of depth information and a captured image of an operator;
a display device configured to:
display a first operation object at a first display position, wherein the first operation object is an operation surface that includes a plurality of icons; and
display a second operation object at a second display position that corresponds to an operator's point of view; and
at least one processor configured to:
recognize a shape of an operator's hand, based on the at least one of the depth information or the captured image; and
control the display device to:
move, when the operator's hand is closed and has a holding shape, the first operation object from the first display position to a third display position in a depth direction based on a first movement to change a position of the operator's hand in the depth direction,
wherein at the third display position, a fourth display position of a first icon of the plurality of icons corresponds to the second display position of the second operation object; and
display the first icon.

2. The head mounted display according to claim 1, wherein the at least one processor is further configured to:
keep the first operation object displayed until a second movement of the operator's hand is recognized, wherein the second movement of the operator's hand includes a change in a direction of an operator's finger; and
delete the first operation object based on the second movement,
wherein the second movement of the operator's hand further includes rotation of the operator's hand; and
control, based on a recognition of the rotation of the operator's hand in a first direction, the display device to display the first operation object at a depth position that corresponds to a depth position of the operator's hand after the rotation.

3. The head mounted display according to claim 2, wherein the at least one processor is further configured to control the display device to delete the first operation object, based on a recognition of rotation of the operator's hand in a second direction opposite to the first direction.

4. The head mounted display according to claim 1, wherein the at least one processor is further configured to:
recognize an operator's first hand and an operator's second hand simultaneously;
move the first display position of the first operation object based on a position of the operator's first hand in the depth direction, wherein the first display position is moved based on a recognition of the holding shape of the operator's first hand; and
determine a tap operation on the first operation object, corresponding to a position of a finger of the operator's second hand, wherein the tap operation is determined based on a determination that a shape of the operator's second hand is a finger pointing shape.

5. The head mounted display according to claim 4, wherein the at least one processor is further configured to determine the tap operation on the first operation object, based on a determination that the position of the finger of the operator's second hand is in front of the position of the operator's first hand in the depth direction.

6. The head mounted display according to claim 5, wherein the at least one processor is further configured to set a ratio of a movement amount of the first operation object to a movement amount of the operator's first hand to be different from a ratio of the movement amount of the first operation object to a movement amount of the operator's second hand.

7. The head mounted display according to claim 5, wherein the at least one processor is further configured to change a ratio of a movement amount of the first operation object to a movement amount of the operator's first hand, based on a distance between the operator's first hand and the operator's second hand in the depth direction.

8. The head mounted display according to claim 7, wherein the at least one processor is further configured to decrease the ratio of the movement amount of the first operation object to the movement amount of the operator's first hand, based on a decrease in the distance between the operator's first hand and the operator's second hand in the depth direction.

9. The head mounted display according to claim 5, wherein the at least one processor is further configured to prevent the first operation object from moving, based on a movement amount of the operator's first hand while the operator's second hand has contact with the first operation object.

10. The head mounted display according to claim 1, wherein
the first operation object includes the first icon and a second icon having a display content different from that of the first icon, and
when the operator's hand is open, the at least one processor is further configured to control the display device to delete the first icon and keep the second icon displayed until a second movement of the operator's hand is recognized.

11. The head mounted display according to claim 1, wherein
the second operation object corresponds a focus frame, and
the at least one processor is further configured to:
control the display device to display the focus frame at the second display position corresponding to the operator's point of view; and
start an application corresponding to the first icon based on a determination that the focus frame is on the first icon for a threshold time period.

12. The head mounted display according to claim 1, wherein
the second operation object corresponds a focus frame, and
the at least one processor is further configured to control the display device to:
display the focus frame on the first operation object, wherein a position of the focus frame on the first operation object corresponds to the operator's point of view; and
select the first icon of the plurality of icons, based on the first movement of the first operation object such that the first icon is inside the focus frame after the first movement of the first operation object.

13. The head mounted display according to claim 12, wherein the second display position of the focus frame is fixed.

14. The head mounted display according to claim 1, wherein the second operation object is placed at a height same as a height of operator's eyes.

15. An information processing method, comprising:
in a head mounted display:
obtaining at least one of depth information and a captured image of an operator;
displaying on a display device, a first operation object at a first display position, wherein the first operation object is an operation surface that includes a plurality of icons; and
displaying on the display device, a second operation object at a second display position that corresponds to an operator's point of view;
recognizing, a shape of an operator's hand, based on the at least one of the depth information or the captured image; and
moving, on the display device, when the operator's hand is closed and has a holding shape, the first operation object from the first display position to a third display position in a depth direction based on a first movement to change a position of the operator's hand in the depth direction, wherein at the third display position, a fourth display position of a first icon of the plurality of icons corresponds to the second display position of the second operation object; and
displaying the first icon.

16. A non-transitory computer-readable medium having stored thereon, computer-executable instructions which when executed by at least one processor of a head mounted display, cause the at least one processor to execute operations, the operations comprising:
obtaining, from at least one sensor, at least one of depth information and a captured image of an operator;
displaying, on a display device, a first operation object at a first display position, wherein the first operation object is an operation surface that includes a plurality of icons; and
displaying on the display device, a second operation object at a second display position that corresponds to an operator's point of view;
recognizing a shape of an operator's hand, based on a basis of the at least one of the depth information or the captured image;
moving, on the display device, when the operator's hand is closed and has a holding shape, the first operation object from the first display position to a third display position in a depth direction based on a first movement to change a position of the operator's hand in the depth direction, wherein at the third display position, a fourth display position of a first icon of the plurality of icons corresponds to the second display position of the second operation object; and
displaying the first icon.

* * * * *